(12) United States Patent
Reitz

(10) Patent No.: US 8,310,072 B2
(45) Date of Patent: Nov. 13, 2012

(54) WIND POWER INSTALLATION, GENERATOR FOR GENERATION OF ELECTRICAL POWER FROM AMBIENT AIR, AND METHOD FOR GENERATION OF ELECTRICAL POWER FROM AMBIENT AIR IN MOTIION

(75) Inventor: Georg Reitz, Bremen (DE)

(73) Assignee: Maria Hoernig (DE)

( * ) Notice: Subject to any disclaimer, the term of this patent is extended or adjusted under 35 U.S.C. 154(b) by 636 days.

(21) Appl. No.: 12/312,155

(22) PCT Filed: Oct. 26, 2007

(86) PCT No.: PCT/EP2007/009331
§ 371 (c)(1),
(2), (4) Date: Apr. 28, 2009

(87) PCT Pub. No.: WO2008/052713
PCT Pub. Date: May 8, 2008

(65) Prior Publication Data
US 2010/0060012 A1 Mar. 11, 2010

(30) Foreign Application Priority Data
Oct. 28, 2006 (EP) .................................. 06022558

(51) Int. Cl.
*F03D 9/00* (2006.01)
*F03B 13/00* (2006.01)
*B60L 11/02* (2006.01)

(52) U.S. Cl. ................ 290/44; 290/43; 290/42; 290/54; 290/55

(58) Field of Classification Search .................... 290/43, 290/44, 54, 55; F03B 13/00; F03D 9/00
See application file for complete search history.

(56) References Cited

U.S. PATENT DOCUMENTS
1,200,308 A 10/1916 Bunnell
(Continued)

FOREIGN PATENT DOCUMENTS
DE 27 17 043 10/1978
(Continued)

OTHER PUBLICATIONS
Engineering Toolbox (http://www.engineeringtoolbox.com/orifice-nozzle-venturi-d_590.html), Orifice, Nozzle, and Venturri Flow Rate Meters, The Wayback Date is Feb. 22, 2006, whole web page.*

*Primary Examiner* — Quyen Leung
*Assistant Examiner* — Terrance Kenerly
(74) *Attorney, Agent, or Firm* — Jansson Shupe & Munger Ltd

(57) ABSTRACT

The present invention relates to a wind power installation (1) for generation of electrical power by means of ambient air, having a flow channel (3) through which the ambient air is passed by an air flow being formed, with the flow channel (3) having an outer casing (6) delimiting it, and also having: a first section (7) with an essentially constant cross section, into which the ambient air can be introduced, with an air acceleration device (39) being provided in the first section (7), a second tapered section (9) which is in the form of a Venturi nozzle (10), a third section (11) which follows the second section (9) and in which a rotor (60) is arranged which is caused to rotate by the air flowing through it, and whose rotation is used to generate electrical power, a fourth flared section (13) which is in the form of a Laval nozzle (12), and a fifth section (15) which has a second air acceleration device (85) used as the exhaust for the air which has been introduced into the flow channel (3).

48 Claims, 30 Drawing Sheets

U.S. PATENT DOCUMENTS

| | | | | |
|---|---|---|---|---|
| 1,234,405 | A | 7/1917 | Solomon | |
| 1,441,774 | A | 1/1923 | Adams | |
| 1,812,741 | A | 6/1931 | Espinosa | |
| 1,974,008 | A | 9/1934 | Biehn | |
| 2,431,111 | A | 11/1947 | Du Brie | |
| 4,079,264 | A | 3/1978 | Cohen | |
| 4,134,707 | A | 1/1979 | Ewers | |
| 4,159,426 | A * | 6/1979 | Staton | 290/44 |
| 4,220,870 | A | 9/1980 | Kelly | |
| 4,245,958 | A | 1/1981 | Ewers | |
| 4,288,200 | A | 9/1981 | O'Hare | |
| 4,421,452 | A * | 12/1983 | Rougemont | 415/4.2 |
| 4,474,529 | A | 10/1984 | Kinsey | |
| 4,609,827 | A | 9/1986 | Nepple | |
| 4,715,776 | A | 12/1987 | Benesh | |
| 4,857,753 | A | 8/1989 | Mewburn-Crook et al. | |
| 5,003,817 | A * | 4/1991 | Pflaum et al. | 73/115.02 |
| 5,037,268 | A | 8/1991 | Fenlon | |
| 5,246,342 | A | 9/1993 | Bergstein | |
| 5,300,817 | A | 4/1994 | Baird | |
| 5,333,996 | A | 8/1994 | Berstein | |
| 5,336,933 | A | 8/1994 | Ernster | |
| 5,664,418 | A | 9/1997 | Walters | |
| 5,740,674 | A * | 4/1998 | Beutin et al. | 60/226.1 |
| 6,246,126 | B1 * | 6/2001 | Van Der Veken et al. | 290/55 |
| 6,710,468 | B1 * | 3/2004 | Marrero O'Shanahan | 290/55 |
| 6,857,846 | B2 | 2/2005 | Miller | |
| 6,929,777 | B1 * | 8/2005 | Litwak et al. | 422/45 |
| 6,948,905 | B2 | 9/2005 | Horjus | |
| 6,984,899 | B1 | 1/2006 | Rice | |
| 7,008,171 | B1 | 3/2006 | Whitworth | |
| 7,352,074 | B1 * | 4/2008 | Pas | 290/43 |
| 7,843,077 | B2 * | 11/2010 | Arduini | 290/43 |
| 2002/0049108 | A1 * | 4/2002 | Hosle | 475/3 |
| 2003/0137149 | A1 | 7/2003 | Northrup et al. | |
| 2003/0156938 | A1 | 8/2003 | Verini | |
| 2004/0041409 | A1 * | 3/2004 | Gabrys | 290/55 |
| 2004/0247438 | A1 * | 12/2004 | McCoin | 416/132 B |
| 2004/0250537 | A1 * | 12/2004 | Krouse | 60/398 |
| 2005/0202776 | A1 * | 9/2005 | Avedon | 454/230 |
| 2006/0182630 | A1 * | 8/2006 | Miller et al. | 415/220 |
| 2007/0029807 | A1 | 2/2007 | Kass | |
| 2010/0207389 | A1 * | 8/2010 | Nyffenegger | 290/44 |

FOREIGN PATENT DOCUMENTS

| | | |
|---|---|---|
| EP | 1 233 178 | 8/2002 |
| JP | 55 164783 | 12/1980 |

* cited by examiner

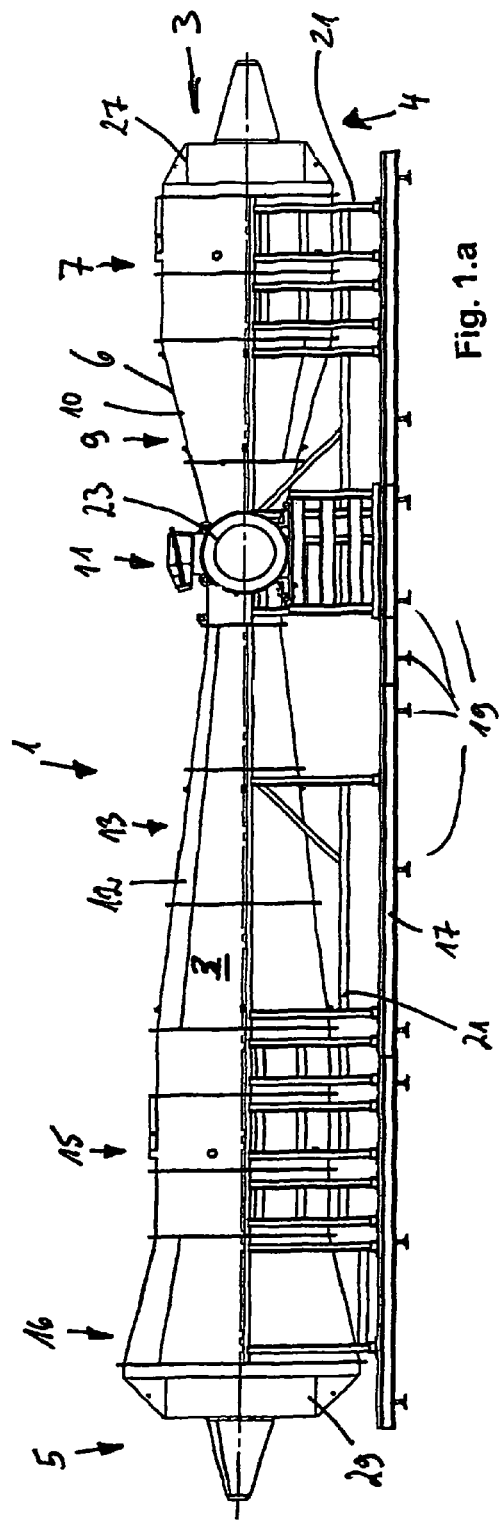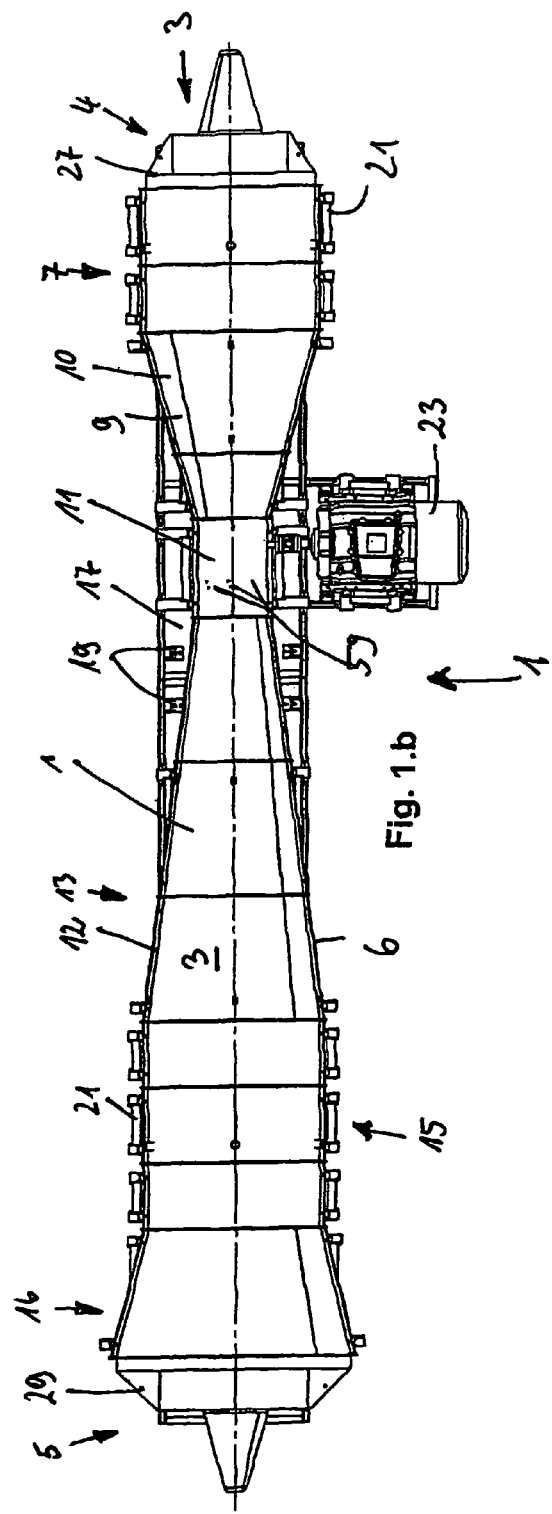
Fig. 1.a
Fig. 1.b

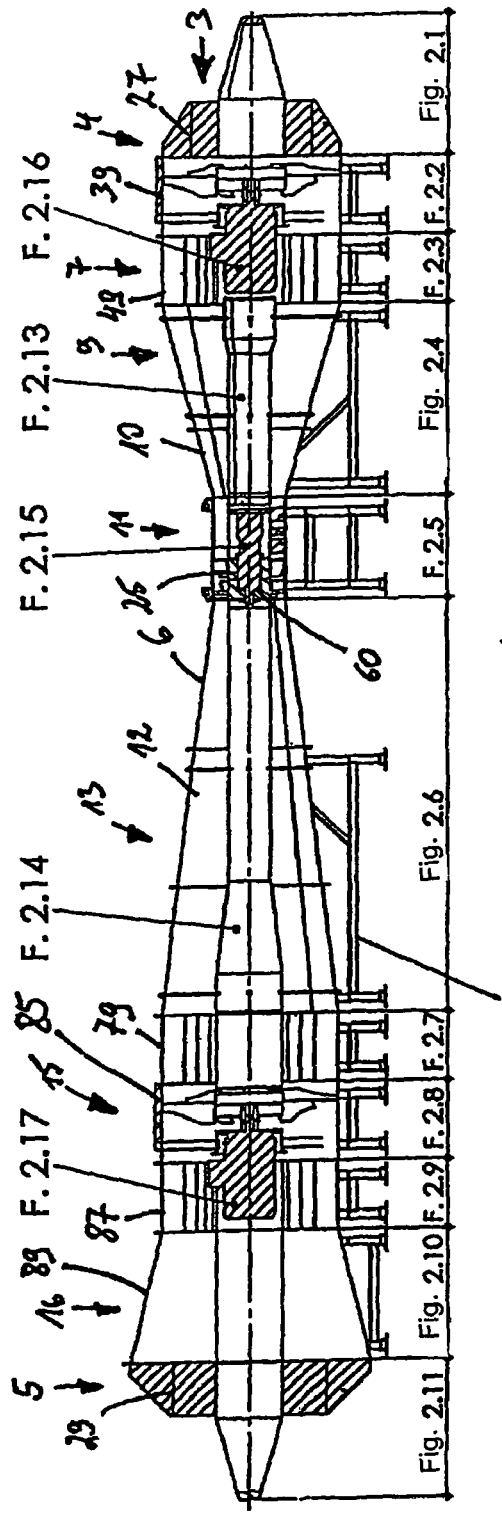
Fig. 2.a
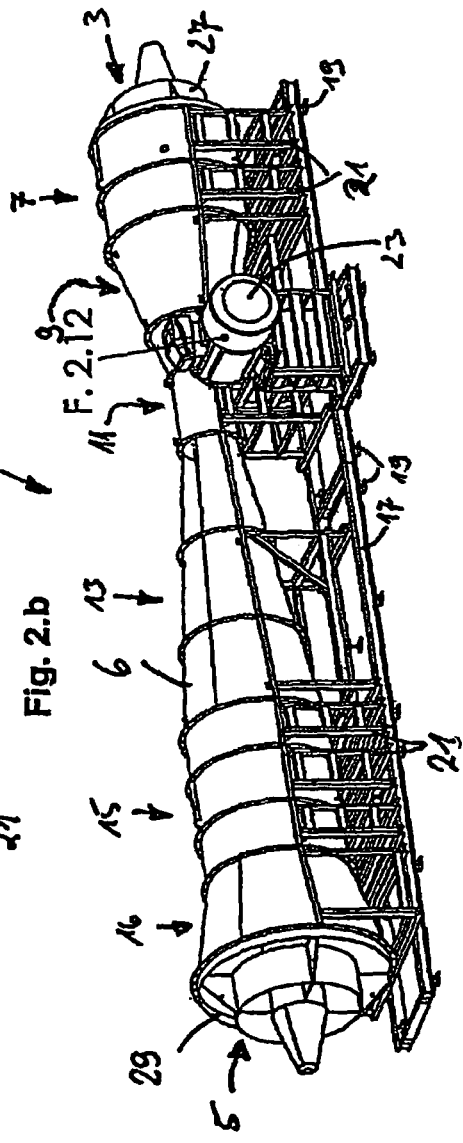
Fig. 2.b

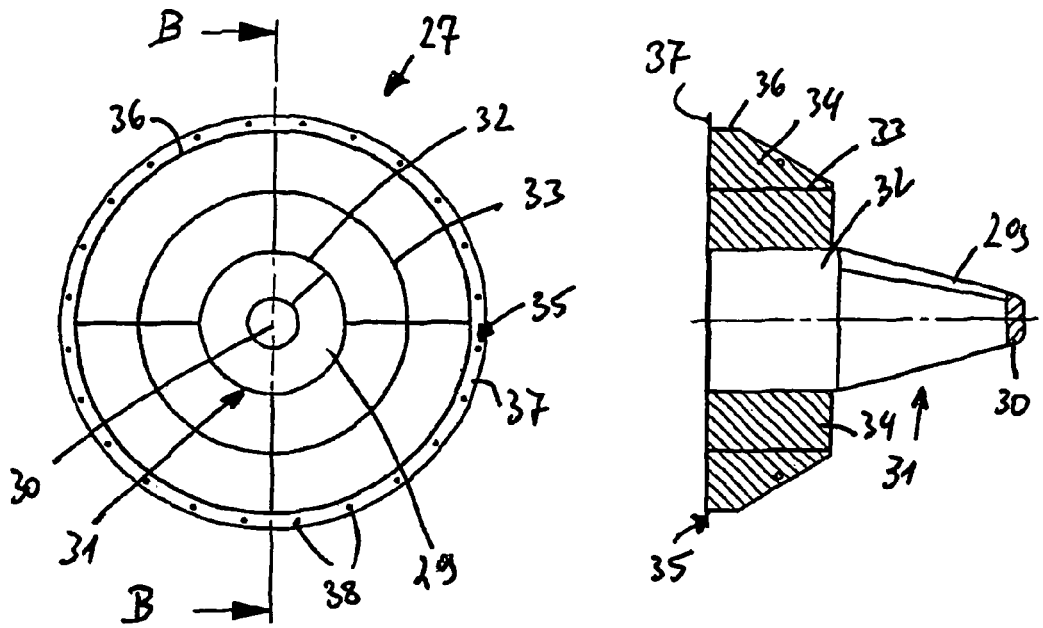
Fig. 2.1.a  Fig. 2.1.b
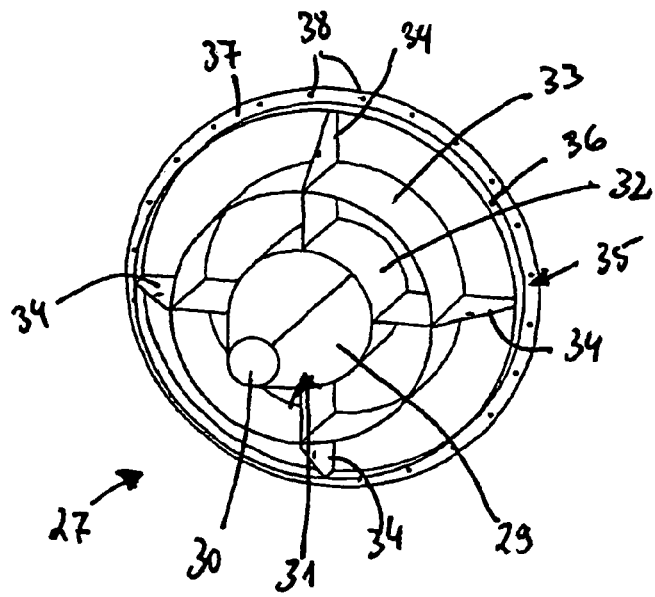
Fig. 2.1.c

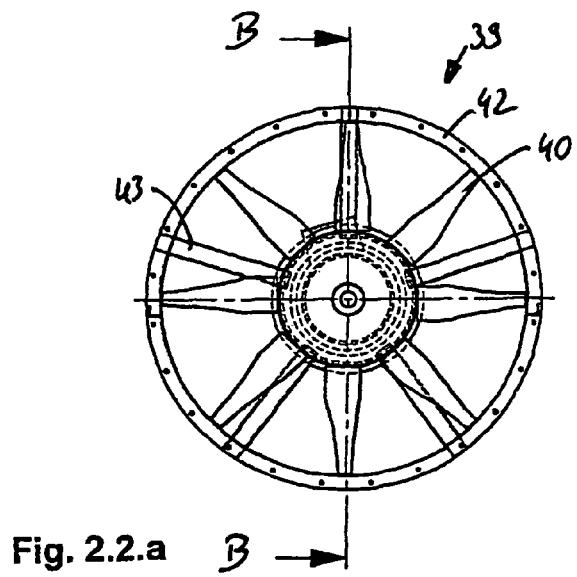
Fig. 2.2.a
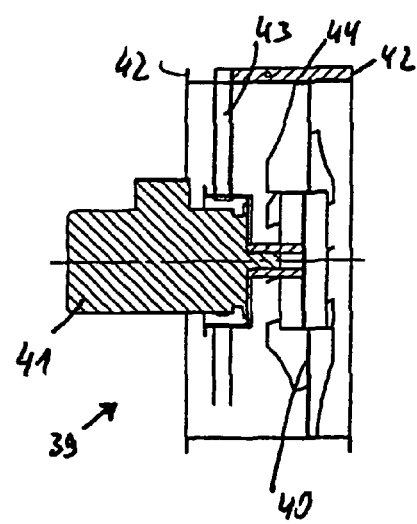
Fig. 2.2.b
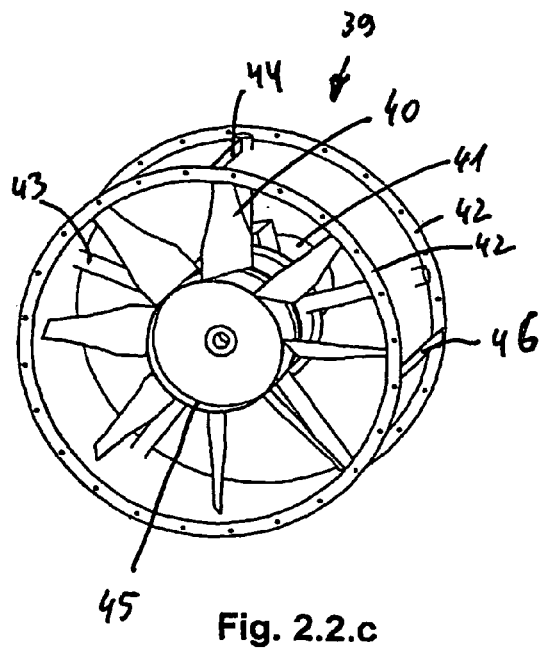
Fig. 2.2.c

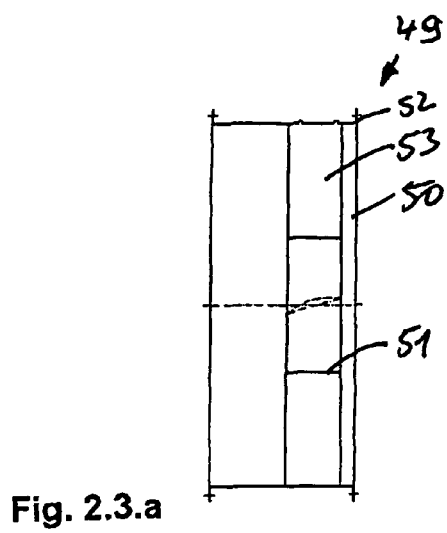
Fig. 2.3.a
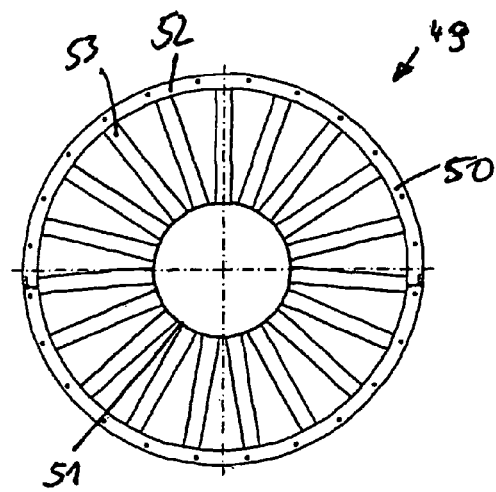
Fig. 2.3.b
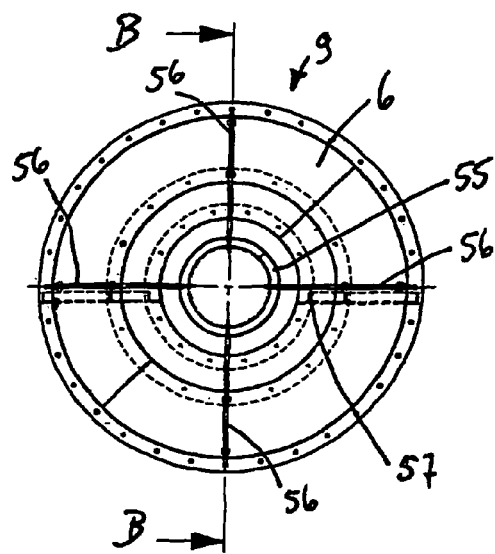
Fig. 2.4.a
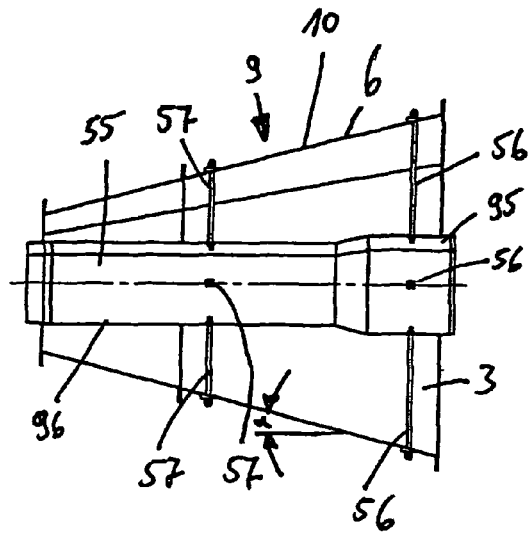
Fig. 2.4.b

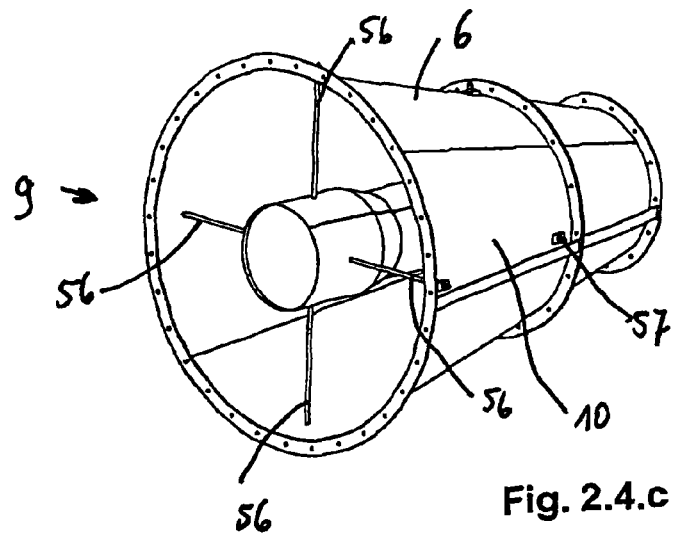
Fig. 2.4.c
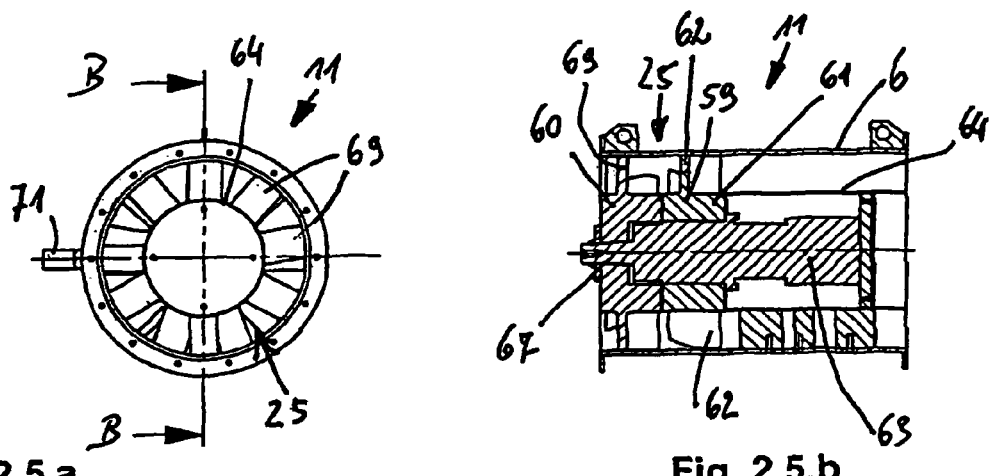
Fig. 2.5.a
Fig. 2.5.b
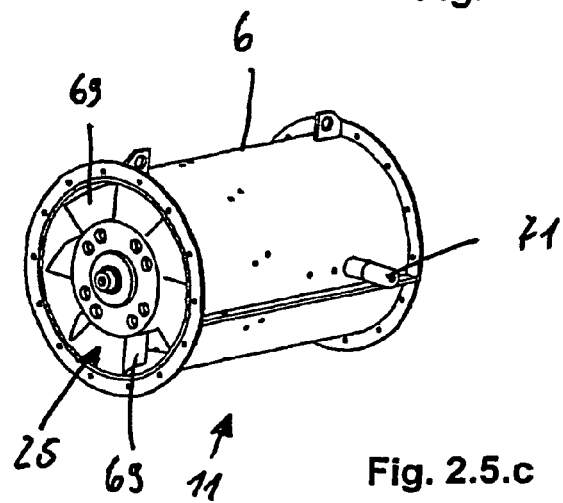
Fig. 2.5.c

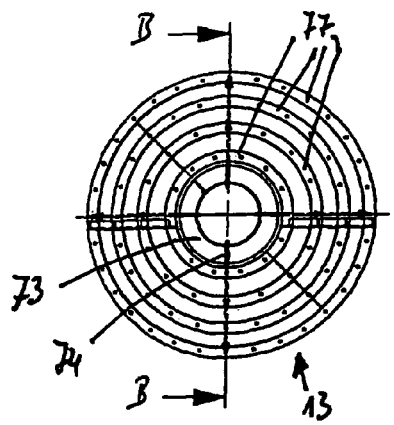
Fig. 2.6.a
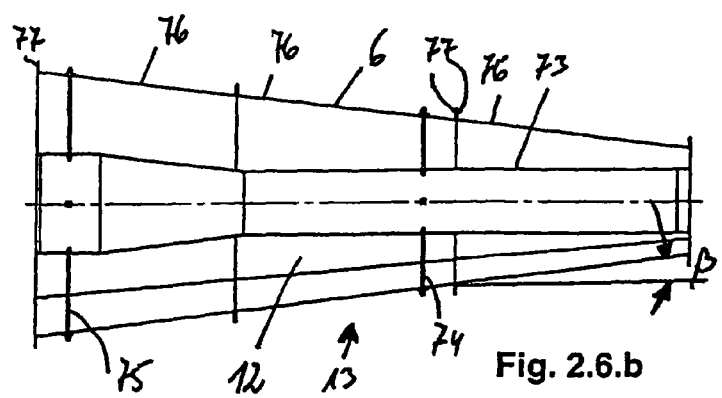
Fig. 2.6.b
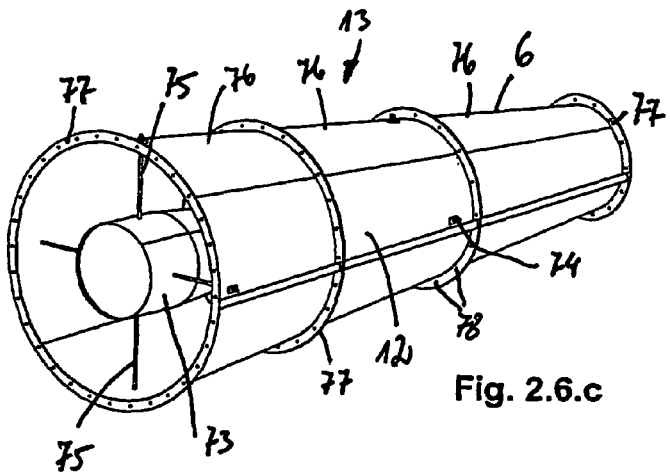
Fig. 2.6.c
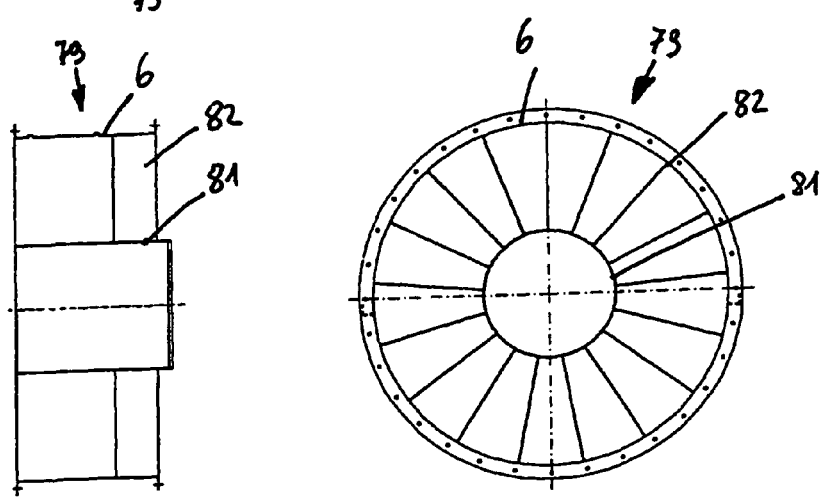
Fig. 2.7.a
Fig. 2.7.b

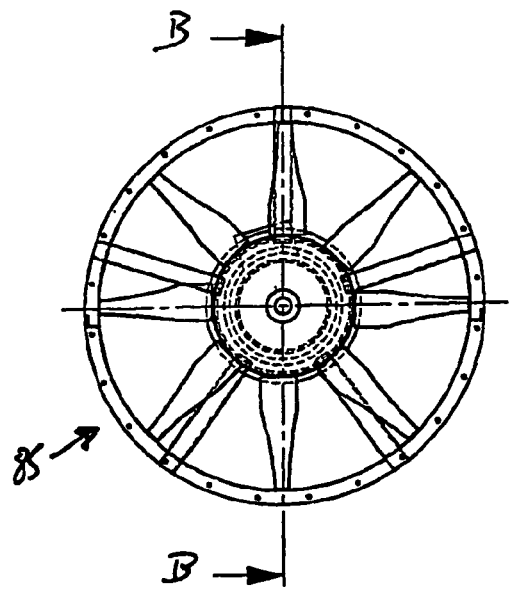
Fig. 2.8.a
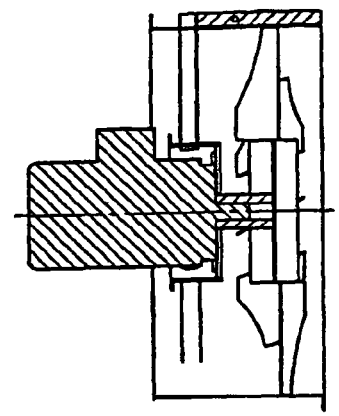
Fig. 2.8.b
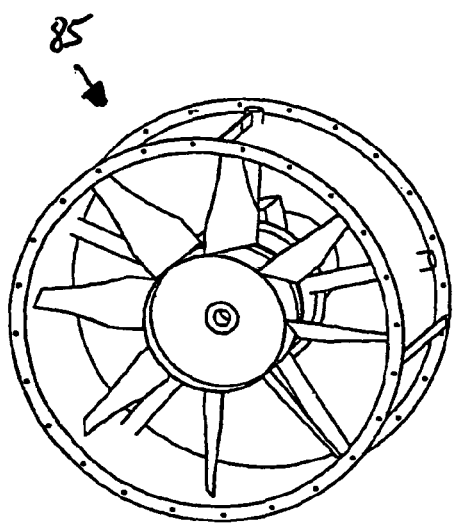
Fig. 2.8.c
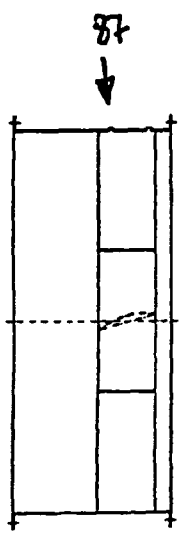
Fig. 2.9.a
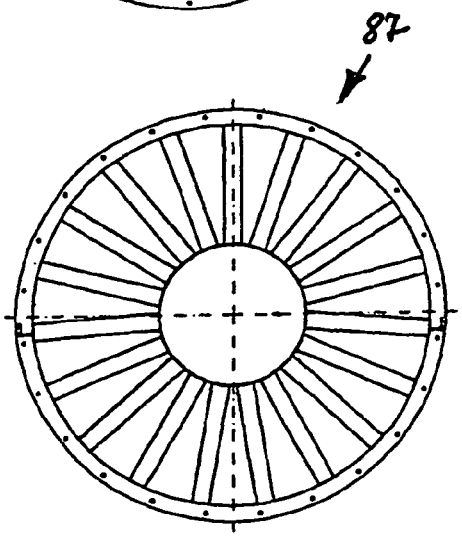
Fig. 2.9.b

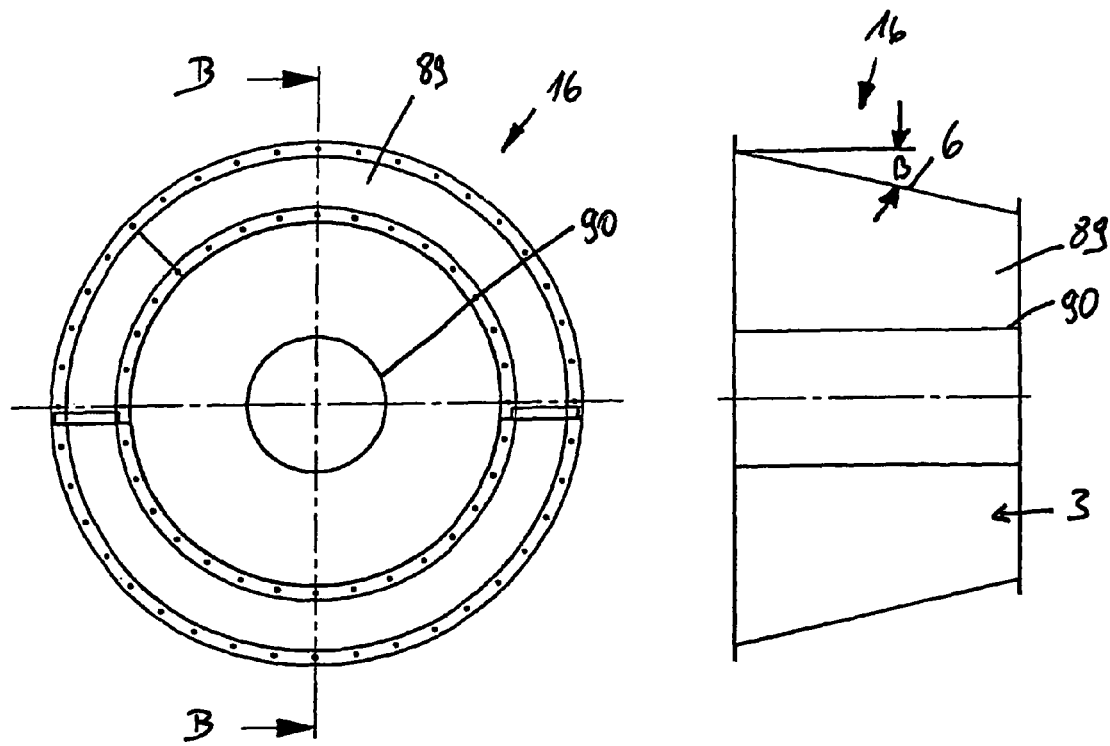
Fig. 2.10.a
Fig. 2.10.b
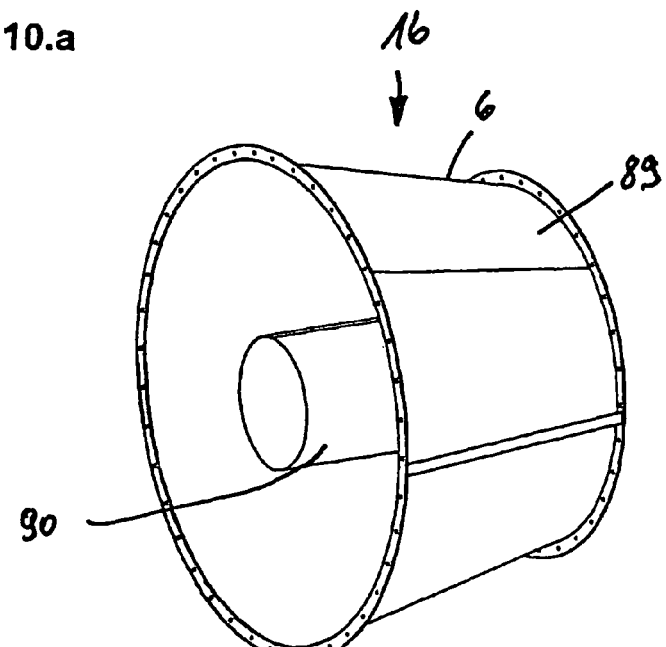
Fig. 2.10.c

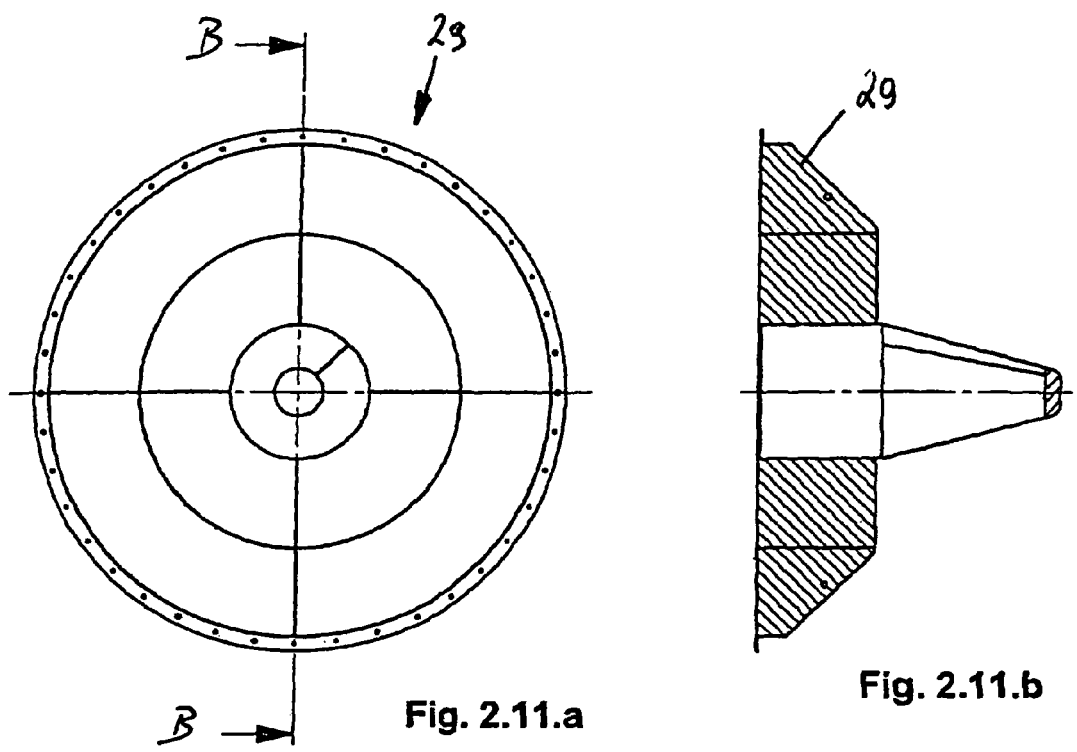
Fig. 2.11.a
Fig. 2.11.b
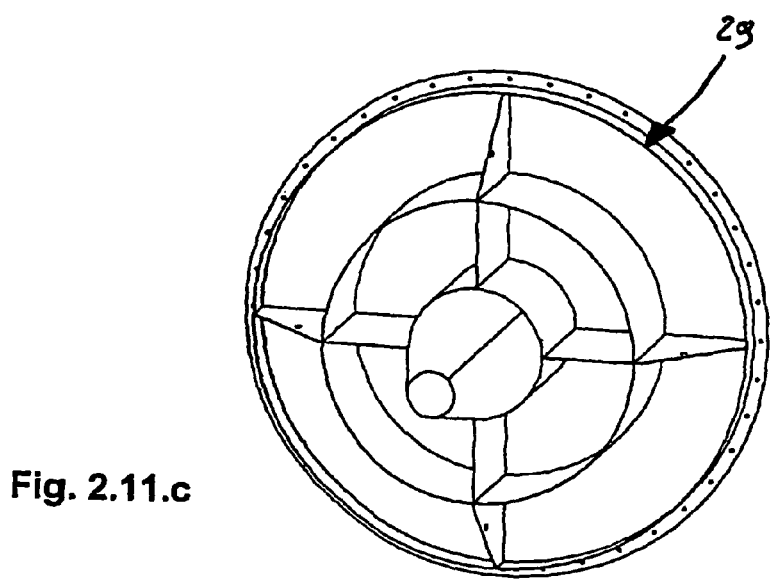
Fig. 2.11.c

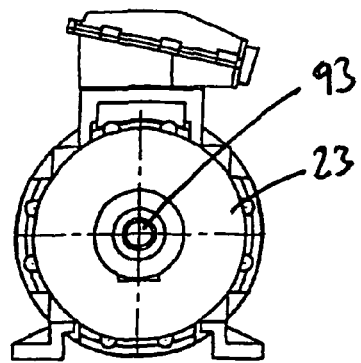
Fig. 2.12.a
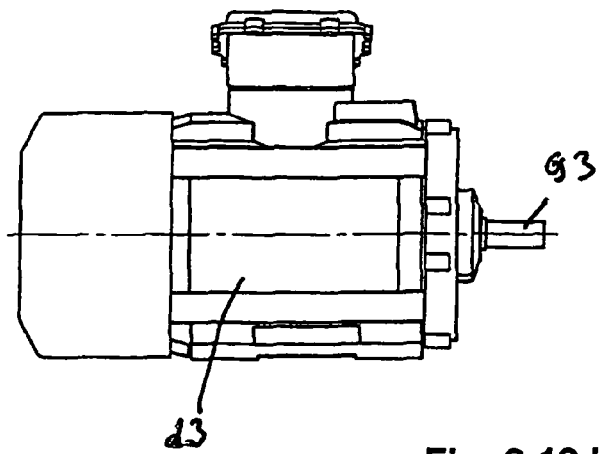
Fig. 2.12.b
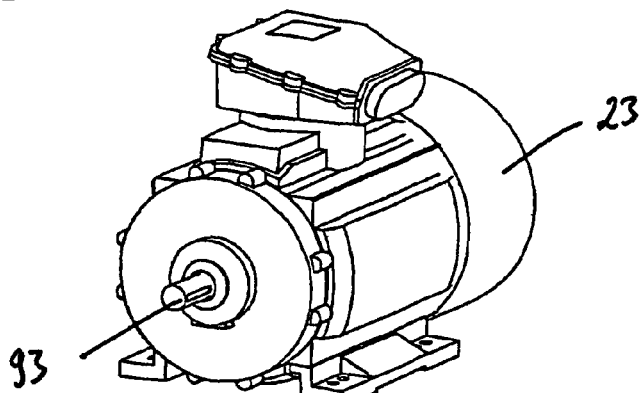
Fig. 2.12.c
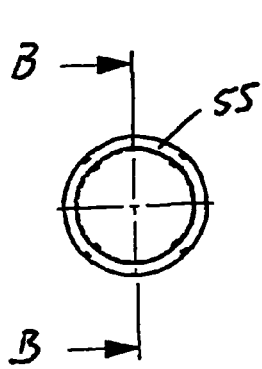
Fig. 2.13.a
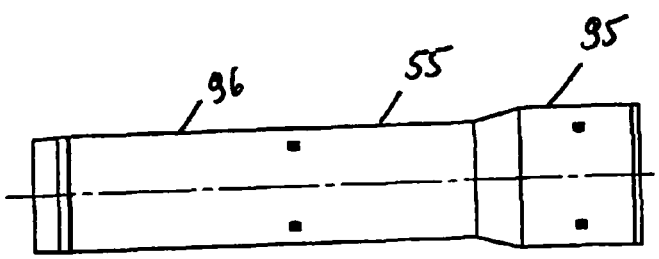
Fig. 2.13.b

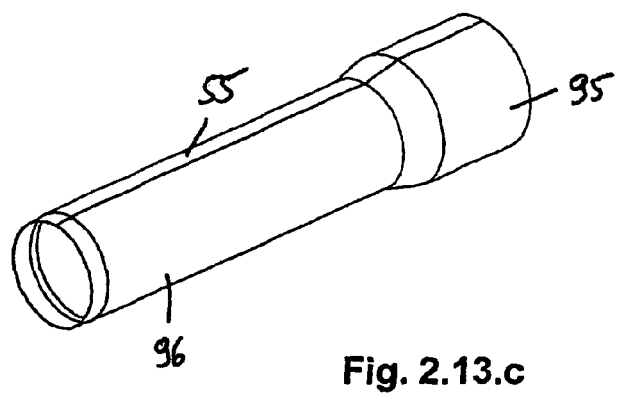
Fig. 2.13.c
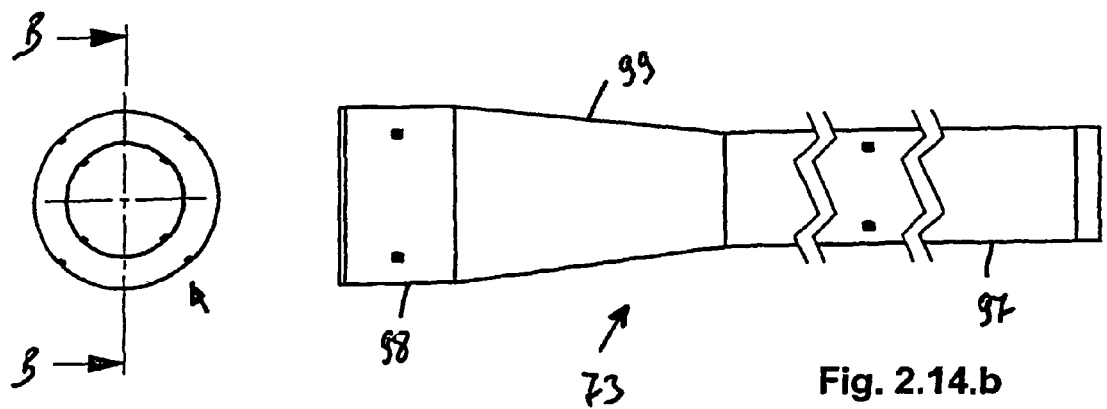
Fig. 2.14.a
Fig. 2.14.b
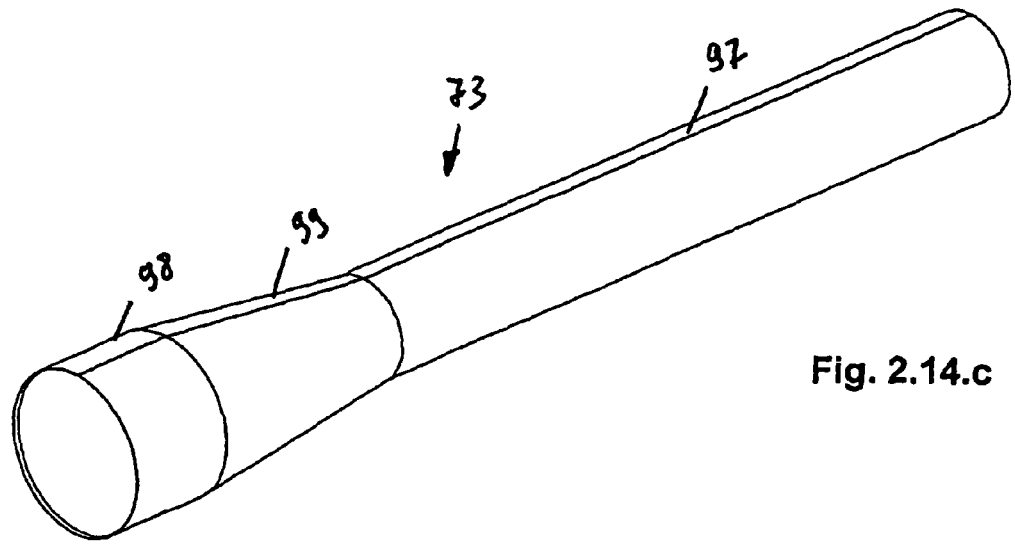
Fig. 2.14.c

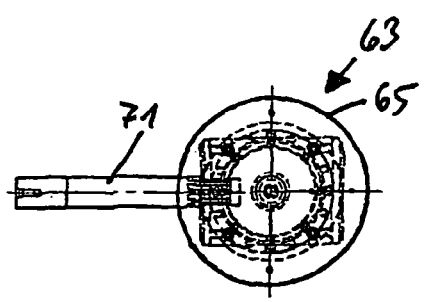
Fig. 2.15.a
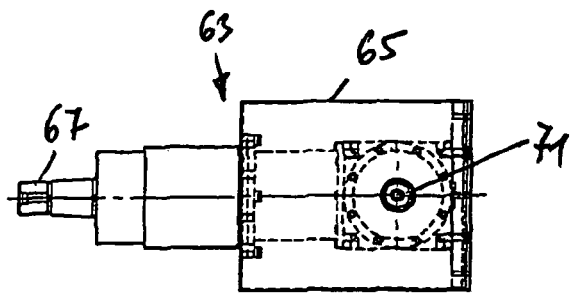
Fig. 2.15.b
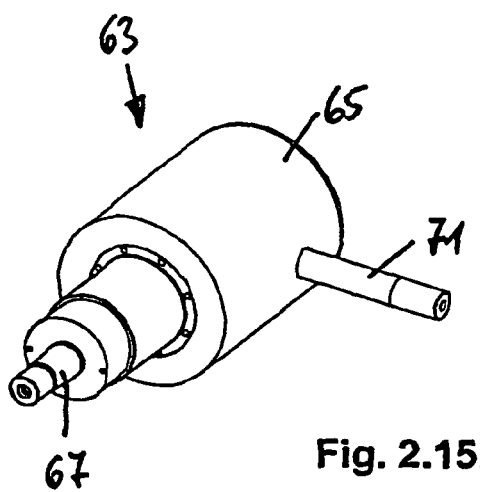
Fig. 2.15.c
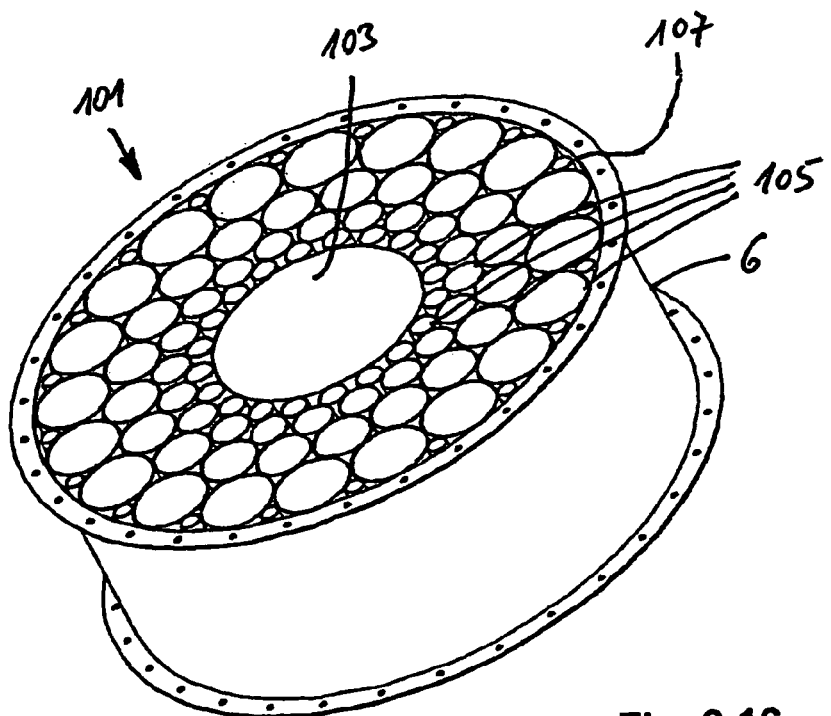
Fig. 2.16

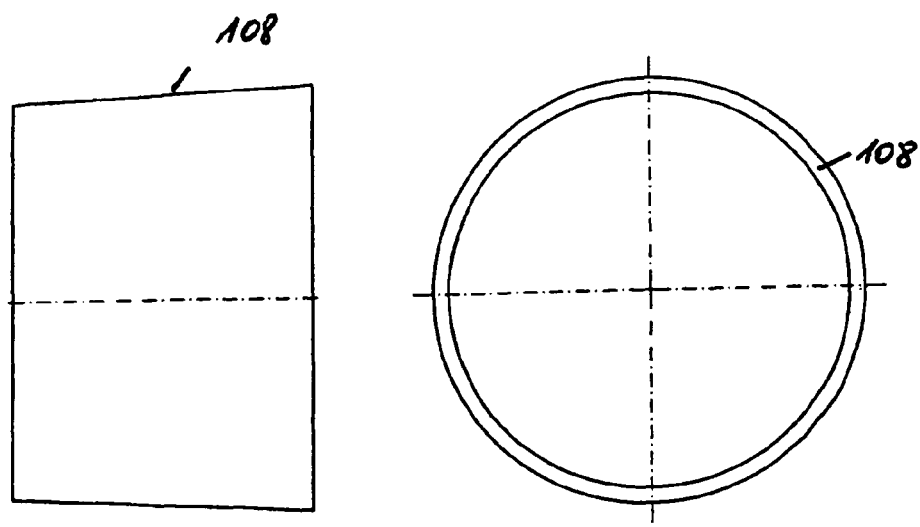
Fig. 3.1.a  Fig. 3.1.b
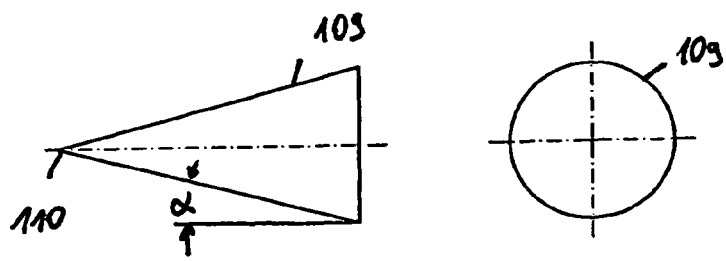
Fig. 3.2.a  Fig. 3.2.b
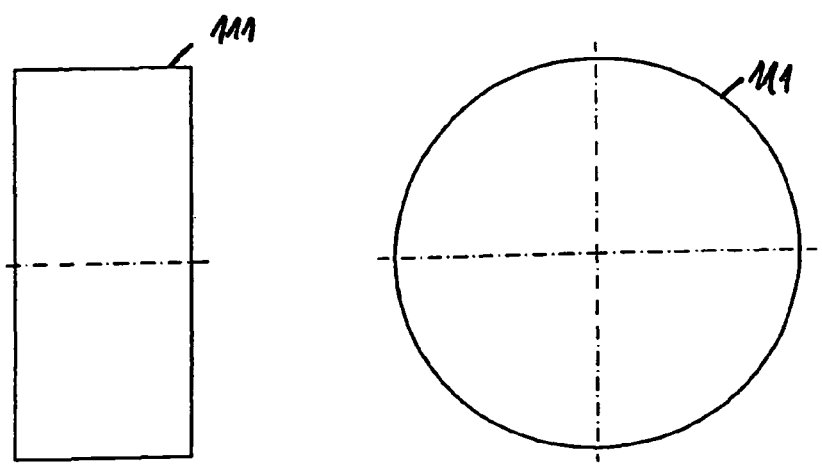
Fig. 3.3.a  Fig. 3.3.b

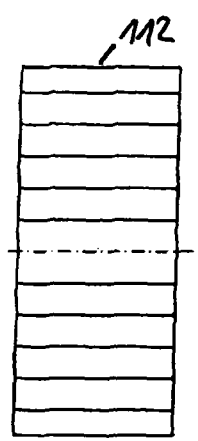
Fig. 3.4.a
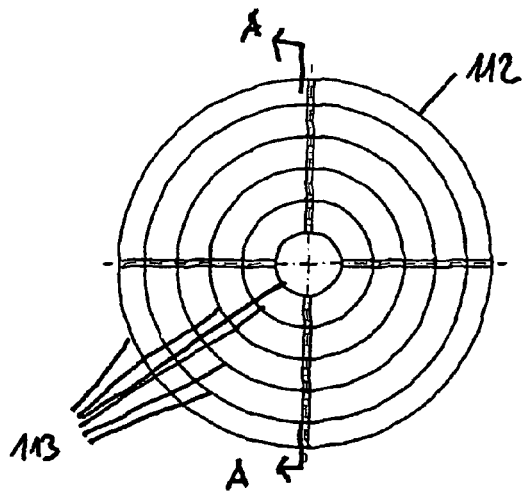
Fig. 3.4.b
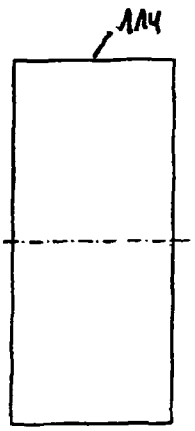
Fig. 3.5.a
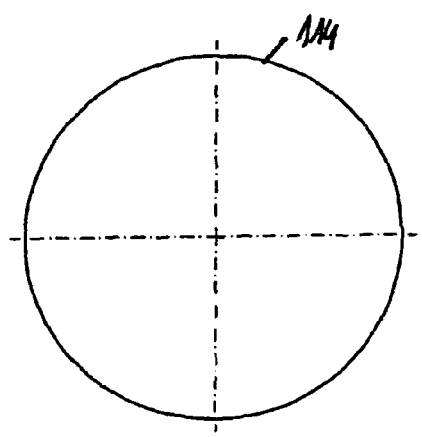
Fig. 3.5.b
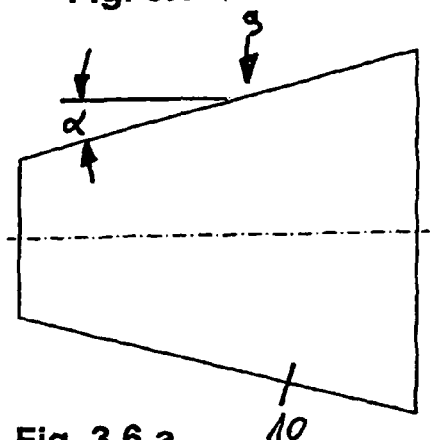
Fig. 3.6.a
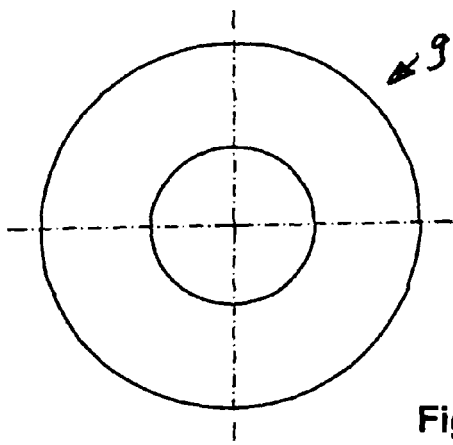
Fig. 3.6.b

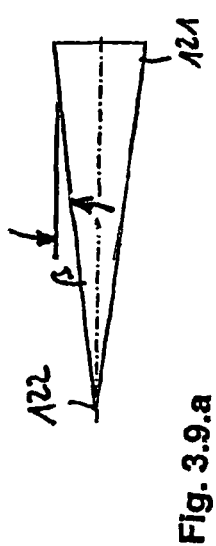
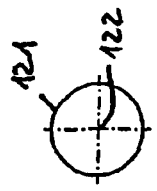
Fig. 3.9.a    Fig. 3.9.b
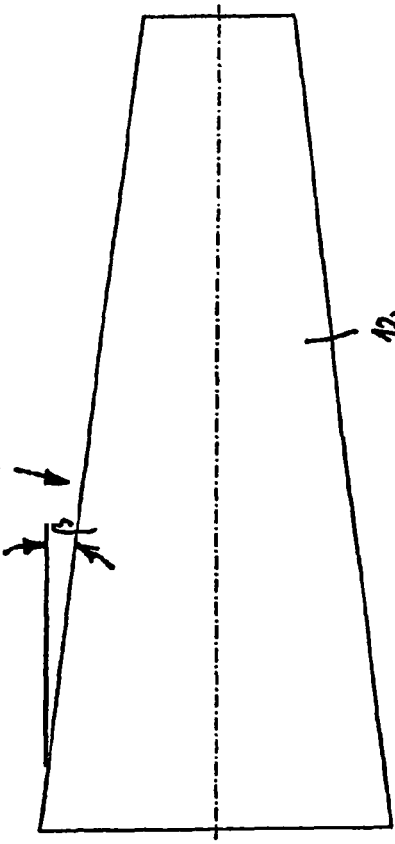
Fig. 3.8.b
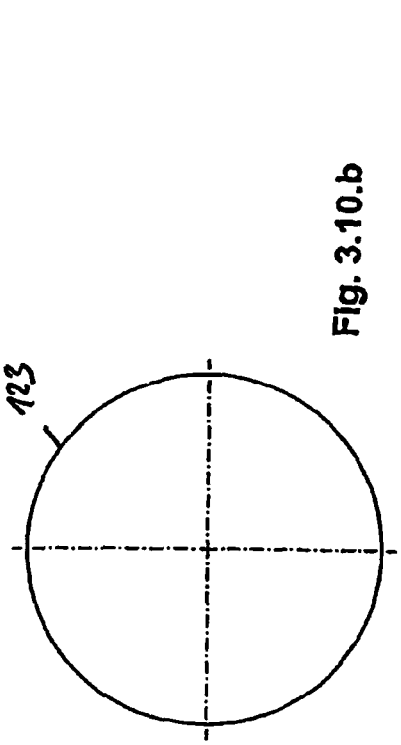
Fig. 3.10.b
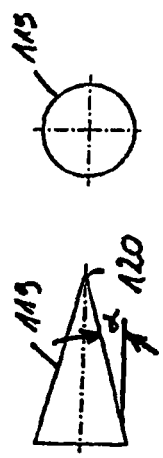
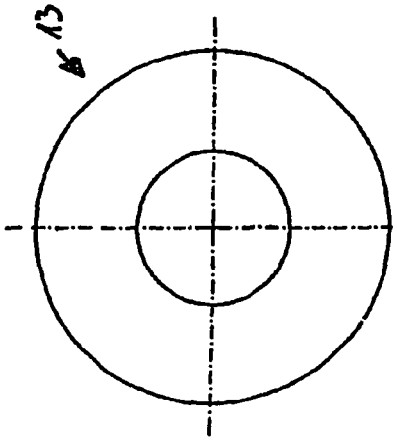
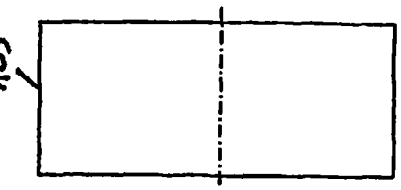
Fig. 3.7.a    Fig. 3.7.b    Fig. 3.8.a    Fig. 3.10.a

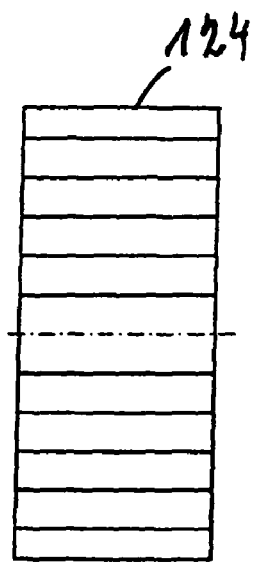
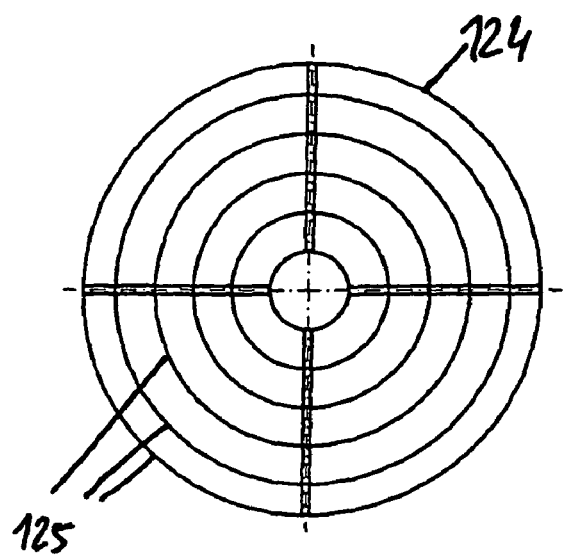
Fig. 3.11.aFig. 3.11.b
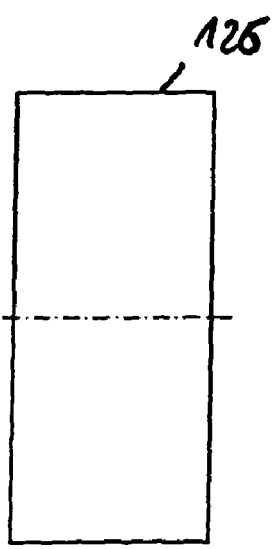
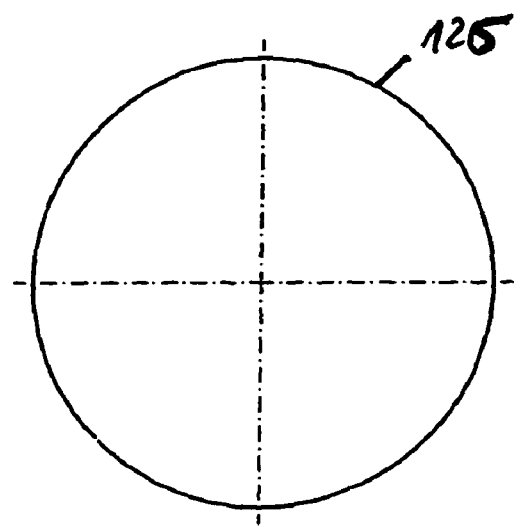
Fig. 3.12.aFig. 3.12.b

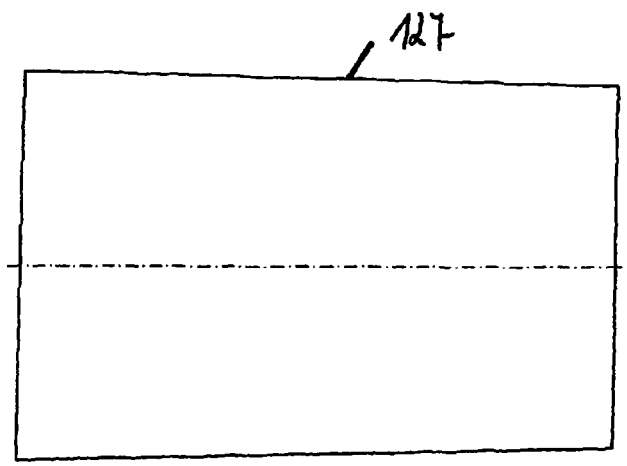
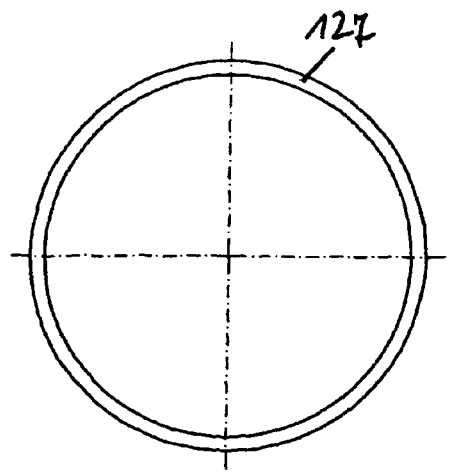
Fig. 3.13.a  Fig. 3.13.b
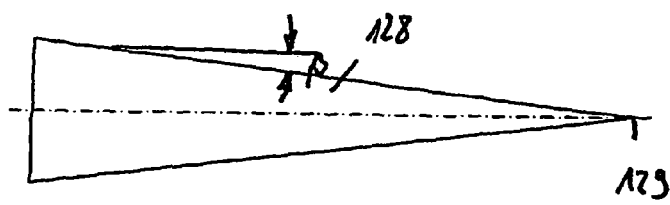
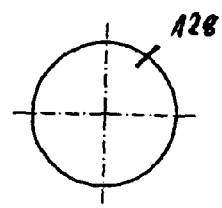
Fig. 3.14.a  Fig. 3.14.b

WIND POWER INSTALLATION, GENERATOR FOR GENERATION OF ELECTRICAL POWER FROM AMBIENT AIR, AND METHOD FOR GENERATION OF ELECTRICAL POWER FROM AMBIENT AIR IN MOTION

FIELD OF THE INVENTION

The present invention pertains to a wind power installation for generating electric power by means of the ambient air flowing through it. The present invention also pertains to a wind power installation system also for generating electric power by means of the ambient air flowing through it.

Finally, the present invention pertains to a method for generating electric power from ambient air.

BACKGROUND

For years, largely as a result of government incentives to promote the use of renewable energies, considerable research has been conducted to solve the problems of fossil fuels. Examples which can be given here include wind energy, thermodynamic energy, biofuels, and hydrogen. In spite of all these efforts, however, it has still not been possible to make these forms of energy economically available in such a way that they are able to compete economically with conventional forms of energy conversion such as nuclear power, gas, and coal.

Considerable investments have already been made in the use of wind energy, and these have contributed to the development and realization of installations of single wind turbines and even of wind turbine farms. Converting wind energy by means of wind turbines suffers from the disadvantage that the yield of wind energy is extremely small, especially with respect to the cost of the development, production, and erection of these types of wind turbines or wind turbine farms. There is also the considerable disadvantage that these types of wind power machines can be operated only when the wind is strong enough, and the wind must indeed be very strong for this purpose. In addition, there are also considerable environmental disadvantages. These are expressed both in the unpleasant occurrence of noise but also in the creation of extremely irritating shadows, and the casting of shadows at extremely irritating frequencies. Nor can energy be produced consistently or at uniform levels, because the wind or the intensity of the wind is always changing.

An even greater disadvantage is the enormous amount of space required for machinery per unit of energy generated.

SUMMARY OF THE INVENTION

The present invention is therefore based on the object of creating a wind power installation for generating electric power by means of ambient air which is essentially independent of the prevailing wind velocity of the ambient air and which operates at an optimal flow rate.

The present invention is also based on the object of creating a wind power installation system by means of which a correspondingly large amount of energy is generated.

Finally, the present invention is based on the object of creating a method for generating electric power from ambient air by means of which energy can be generated effectively and independently of wind conditions.

According to the invention, the wind power installation comprises a flow channel, through which the ambient air is conducted in the form of a stream of air. The flow channel comprises an outer sleeve, which forms its boundary, and includes:
a first section with an essentially constant cross section, into which the ambient air can be introduced, wherein an air acceleration device is provided in the first section,
a second tapering section,
a third section, following the second section, in which third section a rotor is installed, which is set in rotation by the through-flowing air stream and the rotation of which serves to generate electric power,
a fourth enlarging or expanding section, and
a fifth section, which comprises a second air acceleration device, which serves to discharge the air introduced into the flow channel.

The inventive wind power installation achieves the advantageous goal that, first, the acceleration devices perform the volumetric work required so that the ambient air can be conducted into the flow channel and back out of the flow channel again into the outside environment. A second advantage of the acceleration devices is that they create a positive pressure in the inlet area and a negative pressure in the outlet area, as a result of which an optimal flow velocity is achieved in the flow channel.

The particular advantage of the inventive wind power installation is that it can produce electric power economically even when there is no wind and is thus superior to all other types of wind turbines. If moving ambient air is present as a result of wind, the efficiency of the inventive wind power installation is increased even more.

An essential advantage of the present invention is also to be seen the fact that not only kinetic energy but also a considerable amount of thermal energy can be extracted from the through-flowing air.

The air acceleration device of the first and/or of the fifth section of the flow channel advantageously comprises a fan. By means of these fans, the air stream can be easily and controllably accelerated, wherein standard components of low cost can be used as fans.

The inventive wind power installation advantageously comprises a flow guide device downstream (with respect to the flow direction of the ambient air) of the air acceleration device of the first and/or of the fifth section of the flow channel. This guide device converts the air stream which has been made turbulent or set into rotation by the air acceleration device in question into a laminar flow. The efficiency of the wind power installation is considerably increased by this laminar flow.

In a preferred embodiment, the flow guide device is designed as a downstream stator or guide wheel. This downstream stator, of simple design, is able to convert the turbulent air flow into a laminar air flow.

Alternatively, the flow guide device can also be designed as a parallel-tube device. Preferably a parallel-tube device of this type comprises a central tube of large diameter, around which circles of concentrically arranged parallel tubes are placed, wherein their diameter increases from one circle of tube to the next, beginning at a tube diameter which is relatively small in comparison to that of the central tube.

It is also advantageous in terms of optimizing the formation of laminar flow in the flow channel for the flow guide device to comprise both a downstream stator and a parallel-tube device.

It is especially advantageous for the inventive wind power installation to comprise, upstream of the air acceleration device of the first section and/or of the air acceleration device of the fifth section, an air guide device for achieving laminar air flow. This leads to the optimization of the air acceleration device, especially for the purpose of increasing the uniformity of the air velocity and of optimizing the energy consumption of the air acceleration device.

It is especially advantageous to provide a parallel-tube device upstream of the air guide device of the fifth section. This parallel tube device serves to calm the flow even more and possibly also to convert the air stream coming from the rotor in the enlarging section, which is also indicated as Laval nozzle, into laminar flow.

To preserve the laminar flow, it is advantageous for the flow channel to taper down in the area of the second tapering section, also indicated as Venturi nozzle at an angle $\alpha$ of 15° or less. As a result, the advantage is achieved that the laminar flow is preserved and that the air stream is thus supplied in optimal fashion in the third section with the rotor.

Downstream of the rotor, it is advantageous for the flow channel to expand in the area of the Laval nozzle by an angle $\beta$ of 7° or less. This design has proved to be especially advantageous.

It is advantageous for the diameter of the flow channel in the area of the first section to be equal to the diameter in the area of the fifth section. This means that the diameter of the flow channel is the same in the areas of the air acceleration devices.

It is also especially advantageous for the cross section of the outlet of the flow channel to be larger than the cross section of the inlet of the flow channel, wherein it is preferably essentially twice as large. This offers the particular advantage that the outlet velocity of the air stream into the environment is considerably reduced, and thus the air stream can be discharged into the environment in a correspondingly simple manner.

Downstream of the flow guide device, after the air acceleration device in the first section, it is advantageous to provide a flow cone, which tapers to a point and along which the air stream flows, wherein the flow channel sleeve tapers down correspondingly. Accordingly, the advantageous result is obtained that the surface area of the hub of the downstream stator or of the hub of the inlet fan is neutralized with respect to flow engineering in such a way that it is possible to achieve an undisturbed air stream downstream of the tip. The reduction of the external cross section serves to maintain the flow velocity.

To calm the air stream even more, a section of constant cross section, in which preferably another flow guide device is provided to increase the laminar flow, is installed adjacent to the tapering flow channel section. At this point it should be pointed out again that one of the parameters for achieving maximum efficiency is that the flow in the flow channel should be as laminar as possible, wherein the turbulence generated by the acceleration devices or the rotor must be neutralized accordingly.

To obtain this advantage, a cone, which expands from a point to the cross section of the hub of the rotor, is provided according to the invention in the second section. Such a cone conducts the air stream in a correspondingly gentle manner to the annular chamber which leads to the rotor.

It is also advantageous to provide a cone, which tapers to a point, in the fourth section, the starting cross section of which is essentially the same as the cross section of the hub of the rotor.

A calming section of the flow channel, which comprises an essentially constant outside diameter and preferably another flow guide device, is advantageously installed adjacent to the fourth section. Thus again a laminar flow is ensured, as a result of which the efficiency of the wind power installation is increased even more.

Such an increase is also obtained by providing a cone or taper, which expands from a point, in the fifth section, upstream of the flow guide device, the ending cross section of which cone corresponds essentially to the cross section of the hub of the flow guide device.

According to the invention, the third section comprises a gear unit, which converts the rotational movement of the rotor into a rotational movement of at least one output or takeoff shaft extending essentially perpendicularly to the flow channel. The takeoff shaft is connected to a generator and drives the generator unit creating power. The entire arrangement can thus be designed very compactly.

It is also advantageous for the gear unit to include a housing, in which a shaft is supported, with one end of the shaft connected outside the housing to a rotor. The other end of the shaft is connected to a takeoff shaft offset by 90° with the housing of the gear unit being supported in a bearing device. The bearing device includes bearing plates which are connected to the outside sleeve of the flow channel. With this design, it is possible to convert the energy of the flowing air into drive shaft energy of a takeoff shaft in an especially advantageous and compact manner.

It is also advantageous for the rotor to be mounted on a shaft which is connected non-rotatably to the bearing device. The rotor includes an external tubular section which forms a part of the outside sleeve of the flow channel. The external tubular section includes a gear rim which serves to transmit the rotational movement by way of a gear unit to a generator. Thus, in this alternative embodiment, it is possible to advantageously transmit the rotational movement of the shaft produced by the rotor to the outside by way of an internally installed gear unit. It is advantageous for the drive force to be tapped on the outside surface of the rotor, which can be done advantageously by distributing several pinions or pinion gears uniformly around the circumference to transmit the rotation of the rotor. Each pinion being connected to a takeoff shaft, each of which is connected in turn to a generator. It is preferable that the unit includes four pinions or pinion gears.

In an another especially advantageous alternative embodiment, the rotor is mounted on a shaft, which is connected non-rotatably to the bearing device. The rotor includes an external section which drives the rotor or armature of a generator. This has the effect of eliminating the need for gear units to transmit the rotational movement of the rotor to a generator by means of corresponding shafts. The wear of these functional elements and of the entire installation is thus reduced accordingly.

As previously explained, the inventive wind power installation can generate current independently of the movement of the ambient air on the basis of the forced movement of the air into the flow channel produced by the acceleration devices. The efficiency of the wind power installation, however, can be improved even more by introducing ambient air which is already in motion outside of the installation, so that the power uptake of the acceleration devices can be reduced.

Because the wind direction of the ambient air changes, it is especially advantageous for the wind power installation to be mounted in a stand which is free to rotate. As a result, the wind power installation can be readily and easily oriented to face the wind.

It is also advantageous for the stand to comprise a bottom wall, an upper roof wall, and a plurality of posts, wherein the first to the fifth sections of the flow channel are arranged essentially between the outermost posts. This leads to the particular advantage that the wind power installation can be not only encapsulated but also sound-damped, as a result of which it is suitable for placement not only outdoors in purely industrial areas or but also in mixed-use areas.

To increase the wind velocity of the inflowing ambient air, it is advantageous to provide another venturi nozzle or tapered section upstream of the first section.

It is also advantageous to provide another Laval nozzle or enlarging section on the air outlet or air discharge side. By means of this additional nozzle, the air which has passed through the wind power installation can be discharged even more advantageously. Both nozzles can have either a cross section which changes in a continuous manner or a cross section which changes in a discontinuous manner, such as a bell-shaped cross section or the like.

So that the entire stand and thus the wind power installation can be rotated with particular ease, the inventive wind power installation comprises a buoyancy unit, which is held or supported in a floating manner in a liquid-filled basin. As a result, there is hardly any friction to interfere with the rotation of the installation.

It is especially advantageous for the inventive wind power installation also to comprise an embodiment in which it is arranged vertically. As a result, a "reverse chimney effect" is advantageously obtained. As a result of the pronounced cooling of the air downstream of the rotor, this air becomes heavier, descends more quickly, and also draws warmer air down by convection from the area above the rotor.

It is advantageous to provide an air feed device, which is preferably semicircular in design, at the upper inlet of the wind power installation. As a result, the ambient air flow is conducted to the inlet of the wind power installation.

It is also advantageous to provide, on the discharge side, a flow deflection device, which includes a flow channel for deflecting the outflowing air stream from the vertical direction into an essentially horizontal direction. Thus the air stream is oriented parallel to the ambient air stream and is carried along by it in a correspondingly favorable manner.

It is advantageous for the flow channel to be arranged in a deflector body, around which the ambient air flows. This deflector body supports the installation when the installation is turned to face the wind and generates a suction effect increasing the speed of the air leaving the wind power installation.

An even more efficient installation is achieved according to the invention in that the flow channel expands in the flow direction, e.g., in its horizontal section, as a result of which better discharge is achieved. An even greater increase in air flow is noted when an additional air acceleration device is provided in the channel.

To improve the outflow of the air stream from the wind power installation even more, several baffle plates are arranged downstream (with respect to the flow direction) of the flow channel. These plates project preferably beyond the cross section of the flow channel. As a result, the air stream of the flow channel is conducted more effectively, but the ambient air is also aligned in this boundary area.

It is also advantageous to attach a sail to the wind power installation to move the installation into the optimal direction of the ambient air.

The present invention also pertains to wind power installation systems for generating electric power by means of ambient air, wherein the wind power installation system comprises several wind power installations, as described above, arranged on top of one another and/or next to one another.

The wind power installation system preferably comprises a stand, in which the wind power installations arranged on top of or next to each other are rotatably supported. Thus the wind power installation system itself can also be turned to face the wind.

Finally, the present invention also pertains to a method for generating electric power from ambient air, preferably moving ambient air, which comprises the following steps:

introducing ambient air into a first section of a flow channel, accelerating the air stream by means of an acceleration device, which is installed in the first section of the flow channel, further accelerating the air stream in a second tapering section of the flow channel by means of a constriction in the flow channel, conducting the air stream through a third section of the flow channel and the driving of a rotor in this section, discharging the air stream into a fourth enlarging section of the flow channel, renewedly accelerating the air stream in a fifth section of the flow channel, and discharging the air stream into the environment, wherein both kinetic energy and heat energy are extracted from the air stream during its passage through the flow channel.

It is advantageous to align the incoming air as a laminar flow upstream of the acceleration device of the first and/or of the fifth section of the flow channel. This has the effect of significantly increasing the efficiency of the method.

It is also advantageous to align the through-flowing air again into a laminar flow downstream of the acceleration device of the first and/or of the fifth section of the flow channel. This again has the effect of calming and improving the flow of air in the flow channel and thus of increasing the efficiency of the method.

It is also advantageous to accelerate the air stream in the first and second sections of the flow channel so that it reaches a predetermined velocity by the time it enters the third section of the flow channel. By adjusting the velocity to a predetermined velocity, the goal is achieved that the method is conducted at an optimum point; that is, the air flows by the rotor at the optimal air velocity. Optimization of the method is also achieved by using the fifth section to generate a negative pressure in the fourth section, as a result of which the air is actively drawn away after leaving the rotor.

According to the invention, each of the individual acceleration devices is driven by external power at the start of the power generation process, but once an a stable power generation state is achieved, the acceleration devices are fed by the power generated by the installation. Thus an optimized method can be created for the generation of power from ambient air, wherein the energy input to the acceleration devices consumes only a very small part of the entire amount of energy generated. As a result, an especially high efficiency is achieved by this method.

BRIEF DESCRIPTION OF THE DRAWINGS

Additional details, features, and advantages of the present invention can be derived from the following description, which makes reference to the drawing:

FIG. 1.a shows a side view of a first embodiment of the inventive wind power installation;

FIG. 1.b shows a plan view of the inventive wind power installation of FIG. 1.a;

FIG. 2.a shows a cross-sectional view of the inventive wind power installation of FIG. 1.a;

FIG. 2.b shows a perspective view of the inventive wind power installation according to FIGS. 1.a, 1.b, and 2.a;

FIG. 2.1.a shows a front view of an embodiment of the inlet area of the inventive wind power installation;

FIG. 2.1.b shows a cross-sectional view along line B-B of FIG. 2.1.a;

FIG. 2.1.c shows a perspective view of the inlet area of the inventive wind power installation;

FIG. 2.2.a shows a front view of an embodiment of the acceleration device in the first section of the flow channel;

FIG. 2.2.b shows a cross-sectional view along line B-B of FIG. 2.2.a;

FIG. 2.2.c shows a perspective view of the acceleration device of FIG. 2.2.a;

FIG. 2.3.a shows a cross-sectional view of a downstream stator in the first section of the inventive wind power installation;

FIG. 2.3.b shows a front view of the downstream stator of FIG. 2.3.a;

FIG. 2.4.a shows a front view of the second tapering section of the inventive wind power installation;

FIG. 2.4.b shows a side view of the inlet nozzle of FIG. 2.4.a;

FIG. 2.4.c shows a perspective view of the inlet nozzle in the second section, from the inlet side;

FIG. 2.5.a shows a view of the inlet side of the third section of the inventive wind power installation;

FIG. 2.5.b shows a cross-sectional view of the third section according to FIG. 2.5.a;

FIG. 2.5.c shows a perspective view of the third section of the inventive wind power installation, from the outlet side;

FIG. 2.6.a shows the fourth section of the flow channel of the inventive wind power installation, from the inlet side;

FIG. 2.6.b shows a cross-sectional view along line B-B of the FIG. 2.6.a;

FIG. 2.6.c shows a perspective view of the fourth section of the flow channel of the inventive wind power installation, from the outlet side of the section;

FIG. 2.7.a shows a cross-sectional view of the upstream stator in front of the acceleration device of the fifth section of the flow channel of the inventive wind power installation;

FIG. 2.7.b shows a front view of the upstream stator according to FIG. 2.7.a;

FIG. 2.8.a shows a view of the acceleration device in the fifth section of the flow channel of the inventive wind power installation, corresponding to that of FIG. 2.2.a;

FIG. 2.8.b shows a cross-sectional view along line B-B of FIG. 2.8.a;

FIG. 2.8.c shows a perspective view of the second acceleration device in the fifth section of the flow channel of the inventive wind power installation, corresponding to the diagram of FIG. 2.2.c;

FIG. 2.9.a shows a cross-sectional view of the downstream stator in the fifth section of the flow channel of the inventive wind power installation;

FIG. 2.9.b shows a front view of the downstream stator according to FIG. 2.9a;

FIG. 2.10.a shows a view of an outlet section adjacent to the fifth section of the flow channel of the inventive wind power installation, from the inlet side;

FIG. 2.10.b shows a cross-sectional view along line B-B of FIG. 2.10.a;

FIG. 2.10.c shows a perspective view of the outlet section of FIG. 2.10.a, from the outlet side;

FIG. 2.11.a shows the outlet section of the flow channel of the inventive wind power installation;

FIG. 2.11.b shows a cross-sectional view along line B-B of FIG. 2.11.a;

FIG. 2.11.c shows a perspective view of the end or outlet section according to FIG. 2.11.a, from the outlet side;

FIG. 2.12.a shows a front view of the generator 23 for generating current;

FIG. 2.12.b shows a side view of the current generator of FIG. 2.12.a;

FIG. 2.12.c shows a perspective view of the current generator of FIG. 2.12.a;

FIG. 2.13.a shows a front view of an internal tube, from the inlet side, which extends from the first section through the second section to the third section of the flow channel of the wind power installation of the present invention;

FIG. 2.13.b shows a side view of the internal tube of FIG. 2.13.a;

FIG. 2.13.c. shows a perspective side view of the internal tube of FIG. 2.13.a, from the side of the third section of the flow channel;

FIG. 2.14.a shows a front view of the internal tube, which extends from the third section through the fourth section to the fifth section of the flow channel of the inventive wind power installation;

FIG. 2.14.b shows a shortened side view of the internal tube of FIG. 2.14.a;

FIG. 2.14.c shows a perspective view of the internal tube of FIG. 2.14.a, from the side of the fifth section;

FIG. 2.15.a shows a front view of the gear unit in the third section of the flow channel of the inventive wind power installation with a takeoff shaft extending laterally to the side;

FIG. 2.15.b shows a side view of the gear unit of FIG. 2.15.a;

FIG. 2.15.c shows a perspective view of the gear unit of FIG. 2.15.a from the rotor side;

FIG. 2.16 shows a perspective view of a parallel-tube device for additional calming of the flow;

FIG. 3.1.a shows a side view of the outer circumferential sleeve of the section downstream of the downstream stator in the first section of the flow channel of the inventive wind power installation;

FIG. 3.1.b shows a front view of the sleeve section of FIG. 3.1.a;

FIG. 3.2.a shows a side view of a tapered section located inside the sleeve section of FIG. 3.1.a;

FIG. 3.2.b shows a front view of the tapered section of FIG. 3.2.a;

FIG. 3.3.a shows a tubular sleeve section upstream of the second section of the flow channel of the second embodiment of the wind power installation of the present invention;

FIG. 3.3.b shows a front view of the tubular section of FIG. 3.3.a;

FIG. 3.4.a shows a side view of a tubular section with concentrically arranged tubes;

FIG. 3.4.b shows a front view of the tubular section of FIG. 3.4.a;

FIG. 3.5.a shows a tubular section similar to that of FIG. 3.3.a;

FIG. 3.5.b shows a front view of the tubular section of FIG. 3.5.a;

FIG. 3.6.a shows the second tapering section of the flow channel;

FIG. 3.6.b shows a front view of the tubular section of FIG. 3.6.a;

FIG. 3.7.*a* shows a side view of the expansion section in the second section of the flow channel;

FIG. 3.7.*b* shows a front view of the section of FIG. 3.7.*a* from the left side;

FIG. 3.8.*a* shows a front view of the third section of the flow channel in the form of an enlarging section, from the inlet side;

FIG. 3.8.*b* shows a side view of the third section of the flow channel of FIG. 3.8.*a;*

FIG. 3.9.*a* shows a side view of a tapered section in the form of a cone in the fourth section of the flow channel;

FIG. 3.9.*b* shows a front view of the cone of FIG. 3.9.*a;*

FIG. 3.10.*a* shows a side view of a tubular section similar to that of FIG. 3.5.*a;*

FIG. 3.10.*b* shows a front view of the tubular section of FIG. 3.10.*a;*

FIG. 3.11.*a* shows a side view of a tubular section with a plurality of concentric tubes;

FIG. 3.11.*b* shows a front view of the tubular section of FIG. 3.11.*a;*

FIG. 3.12.*a* shows a side view of a tubular section downstream of the tubular section according to FIG. 3.11.*a;*

FIG. 3.12.*b* shows a front view of the tubular section of FIG. 3.12.*a;*

FIG. 3.13.*a* shows another slightly conical tubular section in the fifth section of the flow channel;

FIG. 3.13.*b* shows a front view of the tubular section according to FIG. 3.13.*a*, from the inlet side;

FIG. 3.14.*a* shows a side view of an expansion section, which is arranged inside the tubular section 3.13.*a;*

FIG. 3.14.*b* shows a front view of the expansion section of FIG. 3.14.*a*, from the left side of that FIGURE;

DETAILED DESCRIPTION OF THE INVENTION

Figure 3:
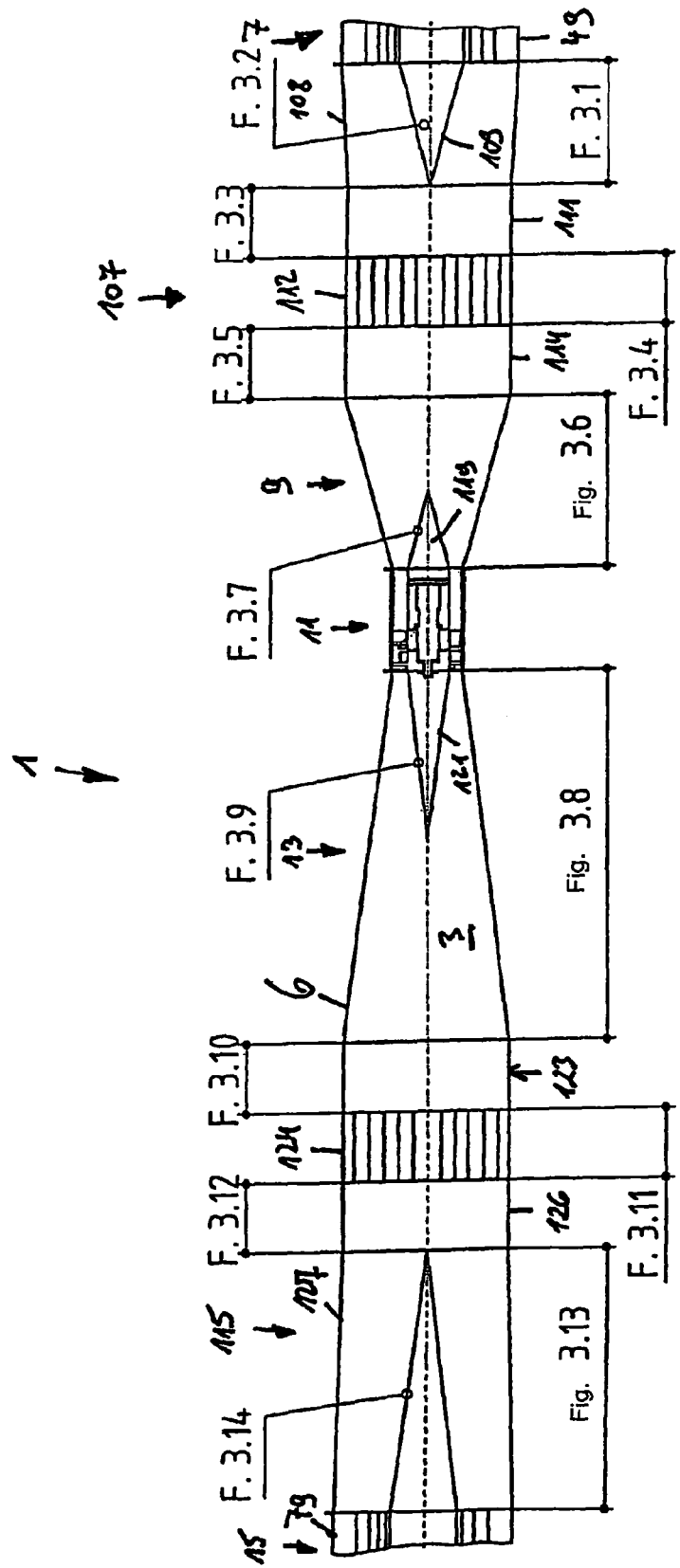
FIG. 3 shows a shortened cross-sectional schematic diagram of a second embodiment of the wind power installation of the present invention without the inlet and outlet sections.

In the figures, elements which are the same are designated by the same reference numbers.

FIG. 1.*a* shows a side view of a first embodiment of an inventive wind power installation 1. The wind power installation 1, which serves to generate electric power from ambient air, comprises a flow channel 3 passing transversely through the installation. The flow channel 3 extends from an inlet side 4 to an outlet side 5.

The inventive wind power installation comprises a plurality of sections: a first section 7, a second section 9, a third section 11, a fourth section 13, and a fifth section 15. The individual sections are described in greater detail below.

Adjacent to the fifth section 15 there is a sixth section 16, by means of which the air stream introduced into the first section 1 is discharged back into the environment.

In the one preferred embodiment of the wind power installation 1 shown in FIG. 1.*a*, the installation is supported on a platform or frame 17, which is supported in turn on feet 19. As can also be seen FIG. 1.*a*, the wind power installation 1, which is essentially circular in cross section, is supported on the frame 17 by a stand 21. The design of the stand is understood in the art and is of the type to support a tubular body on a flat frame.

It can also be seen in FIG. 1.*a*, which shows a first embodiment of the present invention, that there is a generator 23 present, by means of which electric current is generated.

FIG. 1.*b* shows a plan view of the first embodiment of the wind power installation 1, a side view of which is seen in FIG. 1.*a*. As can be seen in FIGS. 1.*a* and 1.*b*, the first section 7 comprises an essentially constant outside diameter of the external sleeve 6 of the flow channel 3. Adjacent to that is the second section 9, which tapers down from the first section 7. It is designed as a tapering section. Adjacent to the second section 9 is a third section 11, which comprises an essentially uniform cross section, and in which a rotor is installed, which is set in rotation by the introduced air steam. The details of the rotor design will be described in detail below.

Adjacent to the third section 11 is the fourth section 13, which is designed in the form of a tubular expansion; it is especially advantageous for this section to be designed in the form of an enlarging or expanding section. The adjacent fifth section 15 comprises an essentially uniform cross section. The sixth section 16, which follows after the fifth section 15, opens out like a funnel, as will be described in greater detail below.

Upstream of the first section 7 on the inlet side 4, an air guide device 27 is located, which has the function of converting the inflowing air stream, which can comprise various turbulence and vortices, into a laminar flow.

Following the sixth section 16 there is another air guide device 29 on the outlet side 5, which serves to discharge the outflowing air stream into the environment insofar as possible as a laminar flow as well, which creates an especially advantageous discharge of the through-flowing air stream into the environment.

Reference will now be made to FIG. 2.*a*, which shows a cross section of the first embodiment of the inventive wind power installation 1. In FIG. 2.*a*, the individual sections also carry the designations FIG. 2.1-F 2.17, which is intended to indicate that the sections in question are shown in greater detail in the associated figures, wherein the term "figure" is what is meant by the abbreviation "F". The individual sections of FIGS. 2.1-2.17 are described in the following in detail with reference to the associated FIGURES. The individual sections are each divided into several separate diagrams and seen from various directions; for example, FIG. 2.1 consists of the diagrams of FIG. 2.1.*a*, FIG. 2.1.*b*, and FIG. 2.1.*c*, i.e., three diagrams of the section designated FIG. 2.1.

FIG. 2.*b* shows a perspective view of the inventive wind power installation 1 according to the first embodiment to illustrate the 3-dimensional aspect of the wind power installation 1.

Reference will now be made to FIGS. 2.1.*a*-2.1.*c*.

FIG. 2.1.*a* shows a front view of the air guide device 27; FIG. 2.1.*b* shows a cross-sectional view along line B-B of FIG. 2.1.*a*; and FIG. 2.1.*c* shows a perspective view of the air guide device 27.

The air guide device 27 comprises a central cone 29, which expands from a forward circular front section 30 and is followed by a tubular section 32. A tubular section 33, which serves to align the incoming air stream in one direction, and which is connected to the tubular section 32 by attachment vanes 34, extends concentrically around the tubular section 32. The vanes 34 extend outward in the radial direction away from the tubular section 32 and are connected to a pipe flange 35. Pipe flange 35 includes a concentric tubular section 36 and a flange 37, which includes bores 38, through which appropriate fastening means can be inserted to establish the connection with the first section 7 of the flow channel 3. FIG. 2.1.*b* shows a cross section of the inlet section along line B-B of FIG. 2.1.*a*.

It should be noted that the fastening means mentioned represent conventional means of connecting tubular sections to each other and are present in all of the individual tubular section elements. For this reason the fastening members are not described in detail for each individual tubular element.

FIGS. 2.2.*a*-2.2.*c* show a first acceleration device 39. The acceleration device 39 is designed in the form of a fan.

As can be seen FIG. 2.2.*b*, fan vanes 40 are set in rotation by a motor 41 and generate a negative pressure or suction, which serves to accelerate the inflowing air stream.

The fan 39 is mounted in the first section 7 in a suitable manner by means of two flanges 42. The motor 41 is connected by struts 43 to longitudinal brackets 44, which serve to secure the motor 41 and thus the fan vanes 40 in position, the vanes being arranged around a bearing ring 45. Additional longitudinal struts 46 serve to stabilize the first acceleration device 39.

FIGS. 2.3.*a*-2.3.*b* show a cross section and a front view of an air flow guide device 49. This serves to calm the air stream rendered turbulent by the air acceleration device and to generate a laminar air flow in the first section 7 of the flow channel 3. In the exemplary embodiments shown in FIGS. 2.3.*a* and 2.3.*b*, the air flow guide device 49 is designed as a downstream stator 50, which comprises a center ring 51, a fastening flange 52, and vanes 53 arranged in a star-like fashion. The star-like arrangement of the vanes 53 converts the swirling and turbulent air stream into a laminar flow.

FIG. 2.4.*a* shows a front view of the second section 9, which is a venturi nozzle 10. FIG. 2.4.*b* shows a cross section of venturi nozzle 10 along line B-B of FIG. 2.4.*a*. As is clear from FIG. 2.4.*b*, the external sleeve 6 of the flow channel tapers down from an inlet cross section to an outlet cross section at a specific angle α. The angle α should be 15° or less, so that a venturi nozzle, such as venturi nozzle 10, is formed. The external sleeve 6 is mounted around an internal tube 55, wherein, for mutual support, four struts 56, 57 are distributed around the circumference. Struts 56, 57 are arranged in two sets of struts at a certain distance apart from each other in the axial direction of the internal tube, and thus support both the external sleeve 6 and the internal tube 55.

As a result of the taper of the external sleeve 6, the inflowing air stream is accelerated in the conventional manner, as is also evident from FIG. 2.4.*c*, which shows a perspective view of the second section 9, i.e., venturi nozzle 10.

After the air stream has been accelerated in the second section 9, it arrives at the third section 11, which is shown in FIGS. 2.5.*a*-2.5.*c*. As is clear from FIG. 2.5.*b*, which shows a cross-sectional view along line B-B of FIG. 2.5*a*, a turbine 25 is installed in the third section 11. This turbine comprises a bearing device 59 and a propeller or rotor 60. The bearing device 59 comprises a bushing or bearing bush 61, on which bearing plates 62 are arranged, which extend radially outward from the bearing bush 61 and are connected to the external sleeve 6. As can be seen in FIGS. 2.5.*b* and 2.5.*c*, the third section 11 comprises a constant cross section. A gear unit 63, which can be of conventional design and which will also be described in detail below with reference to FIGS. 2.15*a*-2.15*c*, is supported in the bearing bush 61.

The gear unit 63 is supported in a tubular section 64 and comprises a rotating shaft 67, on which the rotor 60 is mounted.

The rotor comprises vanes 69, which deflect the through-flowing air stream and are thus set it in rotation, as a result of which the rotating shaft 67 is set in rotation. One end of a takeoff shaft 71 is connected by a so-called "king shaft" to the rotating shaft in appropriate fashion and is thus driven by takeoff shaft 71. The other end of takeoff shaft 71 is connected to the generator 23 (see FIGS. 1.*a*, 1.*b*, and 2.*b*). Driving the generator 23 has the effect of generating current.

Following the third section 11 is the fourth section 13, which is shown in greater detail in FIGS. 2.6.*a*-2.6.*c*. FIG. 2.6.*a* shows a front view of the fourth section 13, seen from the inlet side, the inlet cross section of which is essentially the same as the cross section of the outlet side of the third section 11. As can be seen especially clearly in FIGS. 2.6.*b* and 2.6.*c*, the fourth section 13 expands from the inlet cross section at an angle β, thus forming a section which is known as a Laval nozzle 12, especially when the angle β is 7° or less. This is similar in design to the venturi nozzle 10 and comprises an internal tube 73, the cross section of which also increases toward the outlet side of the fourth section 13. As also in the case of the second section 9, the external sleeve 6 is connected to the internal tube 73 by corresponding struts 74, 75. The expansion of the fourth section 13 proceeds at an angle β of equal to or less than 7°, as a result of which the flow is prevented from stalling. The fourth section 13, as can be seen in FIGS. 2.6.*b* and 2.6.*c*, is built up out of three tubular members 76, each of which include a ring-shaped flange 77 at the two end surfaces. Flanges 77 include a plurality of bores 78, through which, in known fashion, corresponding fastening means can be inserted, as a result of which the tubular pieces 76 can be connected to each other.

FIGS. 2.7.*a* and 2.7.*b* show a cross section and a front view of another flow guide device 79, seen from the inlet side. The flow guide device 79, also called an "upstream stator", comprises a central tubular section 81 and air guide vanes 82 extending radially from it toward the external sleeve 6. Accordingly, air flowing through flow guide device 79 can be increasingly calmed in order to improve laminar flow of the air stream.

The flow guide device 79 forms an inlet section of the fifth section 15 and is followed by a second acceleration device 85, which is shown in FIGS. 2.8.*a*-2.8.*c*. The design of the second acceleration device 85 is essentially the same as that of the first acceleration device 39, described in conjunction with FIGS. 2.2.*a*-2.2.*b*. Accordingly, a detailed description of the second acceleration device 85 of FIGS. 2.8.*a*-2.8.*c* is not required as it is described in connection with FIGS. 2.2.*a* and 2.2.*b* herein. The same is also true for the following air guide device 87 in the fifth section 15, which is identical in design to that shown in FIGS. 2.3.*a* and 2.3.*b*. Accordingly, reference to the description herein can be made to those figures, so that an additional detailed description of the air flow guide device 87 is not required in reference to FIG. 2.9.*c*.

Following the fifth section 15 (see FIGS. 1.*a*-2.*b*), provided with an essentially constant cross section, is a sixth section 16, which is shown in FIGS. 2.10.*a*-2.10.*c*. As can be seen, this is an expanding tubular section 89, with an internal tube 90 and the external sleeve 6 of the flow channel 3. Because of the expansion, the through-flowing air stream is slowed down significantly by the tubular section 89. As an example, when the surface area is doubled, the flow velocity decreases by half. The degree of expansion is preferably equal to the same angle as that defined as angle β above.

FIGS. 2.11.*a*-2.11.*c* show a front view of the air guide device 29, a cross-sectional view along line B-B, and a perspective view. It corresponds in its design to the air guide device 27, shown in FIGS. 2.1.*a*-2.1.*c* and described above. While the air guide device 29 is adapted to the outlet cross section of the tubular piece 89, it comprises the same design as the air guide device 27 and is therefore not described here in any further detail.

FIGS. 2.12.*a*-2.12.*c* show the generator 23. The generator 23 is built in the conventional fashion and comprises an input shaft 93, which can be connected to the takeoff shaft 71 (see FIGS. 2.5.*a* and 2.5.*c*).

FIGS. 2.13.*a*-2.13.*c* show a front view, a side view, and a perspective view of the internal tube 55 of the second section 9, i.e., the venturi nozzle. It comprises a tubular inlet section 95 and a tubular outlet section 96, wherein the tubular inlet section comprises a cross section larger than that of the tubular outlet section.

FIGS. 2.14.*a*-2.14.*c* show a front view, a cross-sectional view along line B-B of FIG. 2.14.*a*, and a perspective view of the internal tube 73 of the fourth section 13, i.e., the Laval nozzle 12. The internal tube 73 comprises a tubular inlet section 97(FIG. 2.14.*b* showing it in shortened form), a tubular outlet cross section 98, and an expanding tubular section 99. The expanding tubular section 99 connects the tubular inlet section 97 of smaller diameter to the tubular outlet section 98 of larger diameter.

FIGS. 2.15.*a*-2.15.*c* show the gear unit 63 in greater detail, wherein it comprises a conventional design with a housing 65. The rotational force is transmitted by the rotating shaft 67, which is driven by the rotor 60 (FIG. 2.5.*b*), to the takeoff shaft 71, which is offset 90° from the rotating shaft 67 and projects outward from the housing 65. During operation, the takeoff shaft is connected to the input shaft 93 of the generator.

FIG. 2.16 shows a perspective view of another air flow guide device 101, which is designed as a first form of a parallel-tube arrangement. As can be seen in FIG. 2.16, concentric circles of tubes 105, parallel to each other, are arranged around a central tube 103, wherein the diameter increases continuously from the first ring around the central tube 103 to the outermost ring. To exploit the maximum possible flow cross section, small tubes 107 are arranged in the intermediate spaces between the tubes 105 of the outermost tube circle. This parallel-tube device 101 also serves to calm the air stream and ensures a laminar air flow at the outlet.

Referring to FIGS. 1.*a*, 1.*b*, 2.*a* and 2.*b*, the function of the wind power installation of the first preferred embodiment will now be described in detail.

It was possible to determine that the efficiency with which energy can be produced from ambient air can be increased when a calmed or laminar air stream is present. For this reason, an air guide device 27 is provided at the air inlet 4 to realign the ambient air, which is possibly in an agitated or turbulent state, into a laminar air stream. Air inlet 4 supplies the laminar air stream to the first air acceleration device 39, which produces a negative pressure relative to the inlet side of acceleration device 39.

After movement through inlet 4, the first air acceleration device 39, which can be in the form of a fan, for example, causes the air stream to become turbulent again. Accordingly, it is advantageous for the following air stream guide device 49 to realign the turbulent air stream again and convert it into a laminar flow.

The venturi nozzle 10 in the second section 9 of the flow channel 3 accelerates the air to a maximum pre-determinable value. It has been discovered that the angle of the venturi nozzle should be equal to or less than 15° in order to avoid making the air stream turbulent again.

In the third section, the accelerated air drives the rotor 60. Kinetic energy is extracted from the air stream at rotor 60 and, as a result, the air stream slows down. In addition, heat energy is extracted from the air stream and as a result the air stream is cooled. Such movement of the air, allows a considerable amount of heat energy to be extracted from the air.

So that no back-pressure is produced by the slowed-down air stream, the air is accelerated again by means of the second acceleration device in the fifth section 15, wherein it is advantageous for an air stream guide device 79 to be provided upstream of the fan to again calm the air flow.

Laval nozzle 12 installed in the fourth section 13 includes an expansion angle β of equal to or less than 7°. As a result of such an expansion angle, undesirable turbulence in the air stream can continue to be avoided.

After the fan, which forms the second acceleration device 85, another air stream guide device 87 is provided. Air stream guide device 85 serves again to calm the turbulent air stream and to bring this in the form of a laminar flow into the sixth section 16. Air stream guide device 85 also expands like a Laval nozzle by an angle β, which leads to a considerable reduction in the velocity of the outflowing air stream. The outflowing air stream is then aligned again by the air guide device 29, with the advantage of a relatively calmed outflow of the air stream into the environment. It should be noted that the embodiment of the wind power installation shown in FIGS. 1.*a*-2.*b* can also function without air stream guide or air guide devices. The efficiency, however, will be improved in the embodiment shown in its entirety in FIGS. 1.*a*-2*b*.

It should also be noted that both the venturi nozzle and the Laval nozzle do not have to taper down or expand in linear fashion. On the contrary, they can have bell-like constrictions and expansions. The important point is that the flow does not stall. The same is also true for the upstream and downstream stators, which serve to increase the efficiency of the wind power installation.

The optimization of the wind power installation is accomplished also by the above-described angles α and β of the venturi and Laval nozzles. It should be understood that the wind power installation is also able to function in principle even if the angles are larger.

In the following, a second preferred embodiment of the inventive wind power installation is described FIGS. 3-3.14.*b*.

FIG. 3 shows essentially the optimized central part of the overall wind power installation, wherein the indications "Figur" or the abbreviated form "F." designate the family of figures which follows FIG. 3, as explained above.

The inlet section 4 and the first section 7 are not shown at all or shown only in shortened form, wherein a first supplemental section 107 follows the first section 7.

The center tubes in the flow channel 3 present in the first embodiment of the wind power installation are partially replaced by conical tapers or expansions, which will be described herein in more detail.

A supplemental section 115 is also provided between the fourth section 13 and the fifth section 15, which will also be described in more detail below.

Reference will now be made to FIGS. 3.1.*a*-3.2.*b*. FIG. 3.1.*a* shows a side view of a tubular section 108, and FIG. 3.1.*b* shows the tubular section 108 from the inlet side. As can be seen in figures, the tubular section 108 tapers down slightly.

FIGS. 3.2.*a* and 3.2.*b* show a conical taper 109 in the form of a straight circular cone, which tapers down in the flow direction to a tip 110. So that the flow velocity of the air stream in the flow channel 3 can be kept constant, the flow cross section between the inlet side and the outlet side of the tubular section 108 is kept constant. This explains the slightly conical dimension of the external sleeve of the tubular section 108. The declination is the angle α.

FIG. 3.3.*a* shows a side view, FIG. 3.3.*b* a front view, of an additional tubular section 111 with an external sleeve of constant diameter. It has been found that an additional tubular section 111 of this type is extremely favorable with respect to the stable flow behavior of the air stream.

FIGS. 3.4.*a* and 3.4.*b* show another air stream guide device 112, namely, a side view as a cross-sectional view along line A-A in FIG. 3.4.*b*. The air stream guide device 112 is formed out of concentrically arranged tubular sections 113 and represents a second embodiment of a parallel-tube arrangement.

Following the tubular section 112 is another supplemental tubular section 114, which is illustrated in FIGS. 3.5.*a* and 3.5.*b*. It is similar in design to the supplemental tubular section 111 shown in FIGS. 3.3.*a* and 3.3.*b* and has the same function as described herein.

FIG. 3.6.*a* is a schematic diagram of the second section 9, which is designed as tapering section with an angle of declination α. FIG. 3.6.*b* shows a front view, from the inlet side, of the second section 9.

FIG. 3.7.*a*. shows a side view of an expansion section 119, which is designed as a straight circular cone, and which expands from a tip 120 at an angle of declination α. FIG. 3.7.*b* shows a front view of the expansion section 119, wherein it is shown from the outflow side.

FIGS. 3.8.*a* and 3.8.*b* show schematic diagrams of the fourth section 13, which is designed as an enlarging section 12 with an expansion angle β. As can be seen in conjunction with FIG. 3, a tapered section 121, proceeding from the third section 11, is arranged in the fourth section 13. A side view of this tapered section can be seen in FIG. 3.9.*a* and a front view in FIG. 3.9.*b*. This tapered section 121 is also designed as a straight circular cone and has a tip 122. Its angle of declination is the same as that of the tapering section or Laval nozzle 12.

It should be pointed out that the angle of declination of the expansion section 119, the angle of declination of the venturi nozzle of the second section 9, and the angle of declination of the tapered section 121 must correspond to the angle of declination of the Laval nozzle of the fourth section 13, so that both the venturi effect and the Laval effect are obtained in their full measure. In this case, what is obtained is a double venturi nozzle and a double Laval nozzle.

FIGS. 3.10.*a* and 3.10.*b* show another tubular section 123, which is designed in essentially the same way as the supplemental tubular sections 111 and 114 (see FIGS. 3.3.*a*, 3.3.*b*, 3.5.*a*, and 3.5.*b*) and which also has the same function.

After the tubular section 123, an air stream guide device 124 according to FIGS. 3.11.*a* and 3.11.*b* includes a concentric tubular sections 125, followed again by another supplemental tubular section 126, which is essentially the same in design as the supplemental tubular sections 11, 114, and 123 and also comprises the same function. The supplemental tubular section 126 is shown in FIGS. 3.12.*a* and 3.12.*b*.

The supplemental section 115, comprises a tubular section 127, which expands slightly in a conical manner as can be seen in FIG. 3.13.*a*. The front view is shown in FIG. 3.13.*b*. An expansion section 128, which, as shown in FIG. 3, is arranged in the tubular section 127, is illustrated in detail in FIGS. 3.14.*a* and 3.14.*b*. It is designed as a straight circular cone and includes a tip 129.

Figure 4:
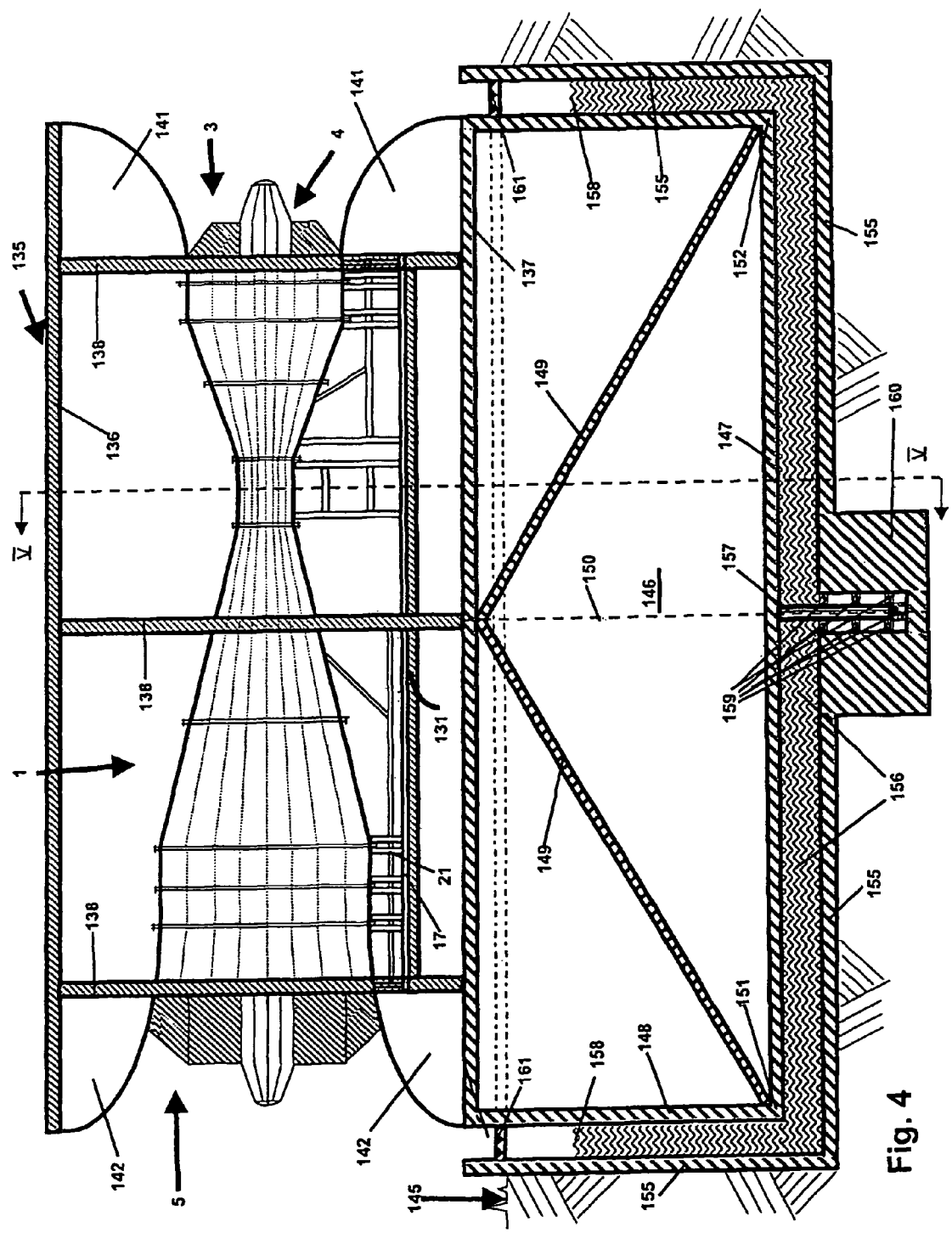
FIG. 4 shows longitudinal cross section, from the side, of the inventive wind power installation according to the first embodiment in a stand on a rotatably supported buoyancy unit, which floats in a water-filled basin.

Reference will now be made to FIG. 4, which shows how the wind power installation illustrated in the embodiment according to FIGS. 1.*a*-2.*b* is set up. The frame 17 with stand 21 is mounted on a plate 131, which is itself arranged in a stand 135. The stand 135 comprises a roof 136, a bottom plate 137, and individual posts 138.

The individual elements of the wind power installation are no longer designated individually in this FIG. 4 for the sake of clarity. On the inlet side 4, a bell-shaped, funnel-like nozzle 141 in the form of a venturi nozzle is additionally provided, which serves to introduce the ambient air into the flow channel 3 at an accelerated rate.

In a corresponding manner, a funnel-like, bell-shaped nozzle in the form of a Laval nozzle 142 is provided on the outlet side 5, which serves correspondingly to slow down the air stream as it is being discharged from the wind power installation 1. This also offers the advantage that there is no need for a large amount of discharge force for the discharge of air.

The bottom plate 137 is located essentially at the level of the surrounding ground 145 and for its own part forms the roof of a buoyancy unit 146. Buoyancy unit 146 is designed in the form of a circular disk and details of such construction are provided herein. The buoyancy unit 146 also comprises a bottom plate 147, a side wall 148, and reinforcing struts 149. The reinforcing struts extend from a center axis 150 into the lower corners 151, 152.

The buoyancy unit 146 is arranged in a circular basin 155, which is filled with a liquid 156. Liquid 156 may preferably include water or a similar liquid. In the area of the center axis 150, a king pin 157 descends vertically down from the bottom plate 147 and is held rotatably in a pivot bearing 159. Pivot bearing 159 is mounted in a foundation block 160.

By the use of this design, it is possible to rotate the buoyancy unit 146 and thus the entire installation with almost no friction. This construction allows the wind power installation to adjust its relative position so that it faces into the prevailing wind. To stabilize the rotation of the cage, a ring-shaped bearing 161 is also provided.

Figure 5:
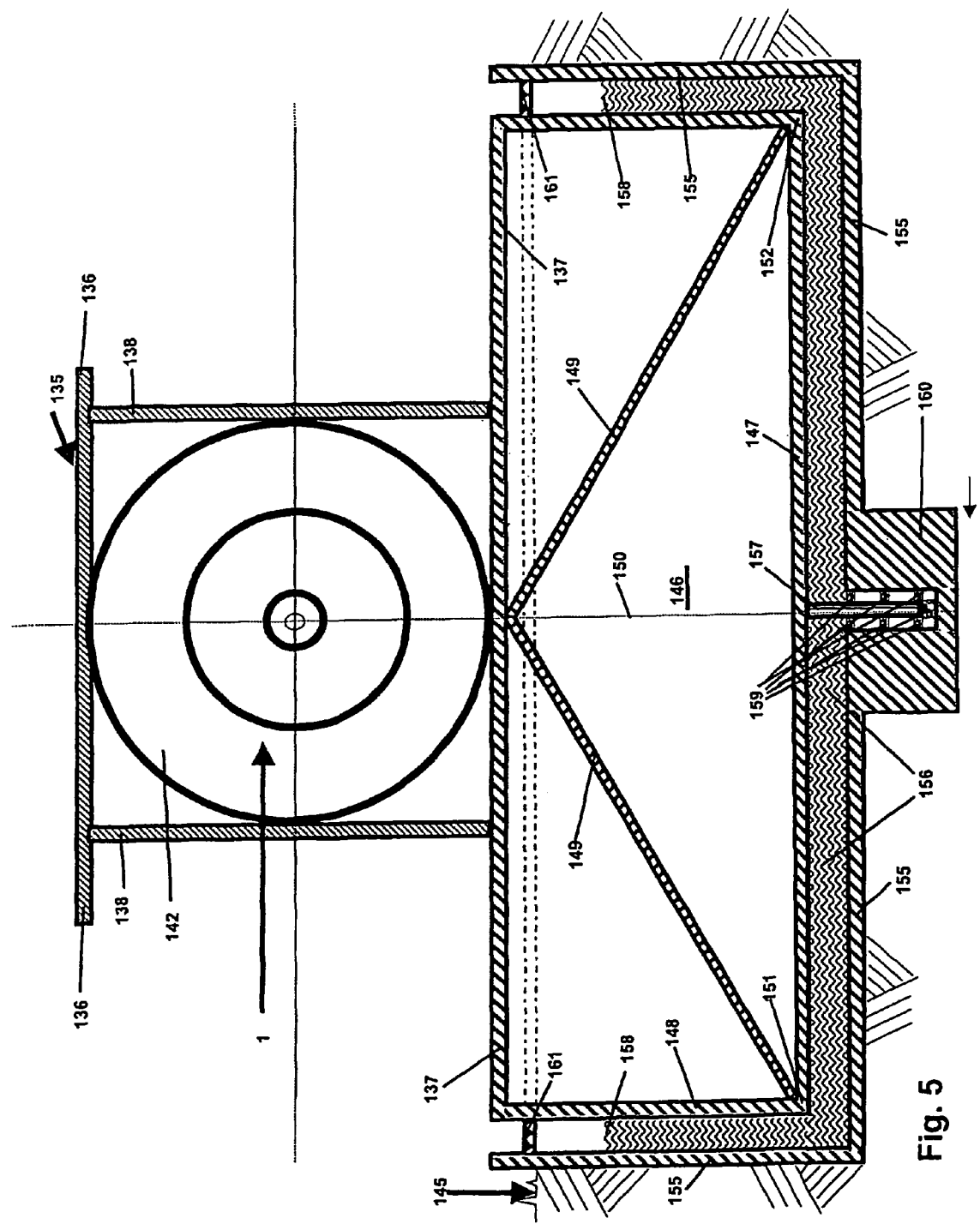
FIG. 5 shows a cross-sectional view along line V-V of FIG. 4.

Reference is now made to FIG. 5, which shows a cross-sectional view along line IV-IV of FIG. 4.

Figure 6:
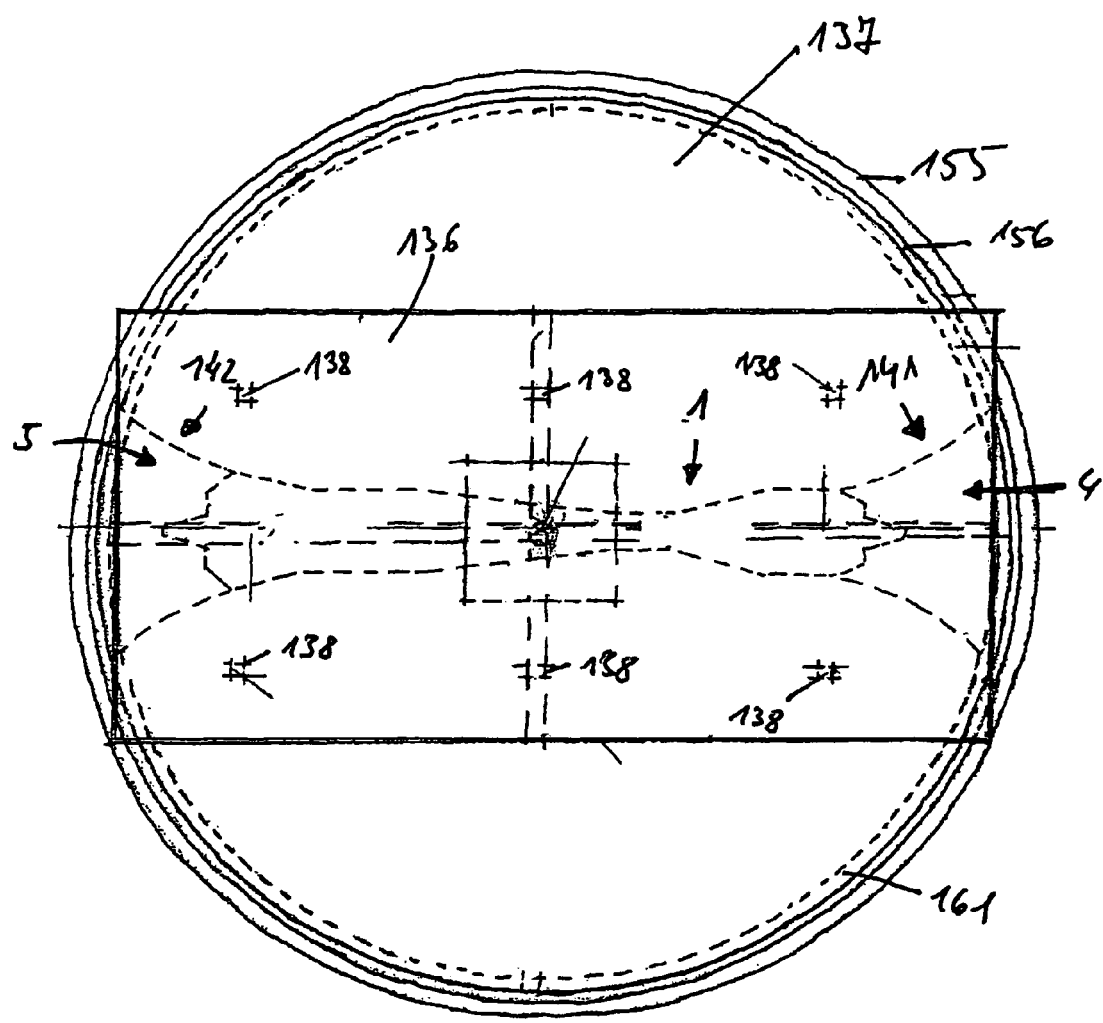
FIG. 6 shows a plan view of the wind power installation with stand according to FIG. 4.

FIG. 6 shows a plan view of a preferred embodiment of wind power installation in its on-site state according to FIGS. 4 and 5. In the view from above, it is easy to see the circular design of basin 155, which contains liquid 156. Circular bottom plate 137 is supported in basin 155 so that it is free to rotate. As can be seen in the plan view according to FIG. 6, the preferred embodiment of the wind power installation is covered by the roof 136 and thus is illustrated merely schematically in broken line. Also shown schematically are the venturi nozzle 141 in the inlet area 4 and the Laval nozzle 142 in the outlet area 5.

Figure 7:
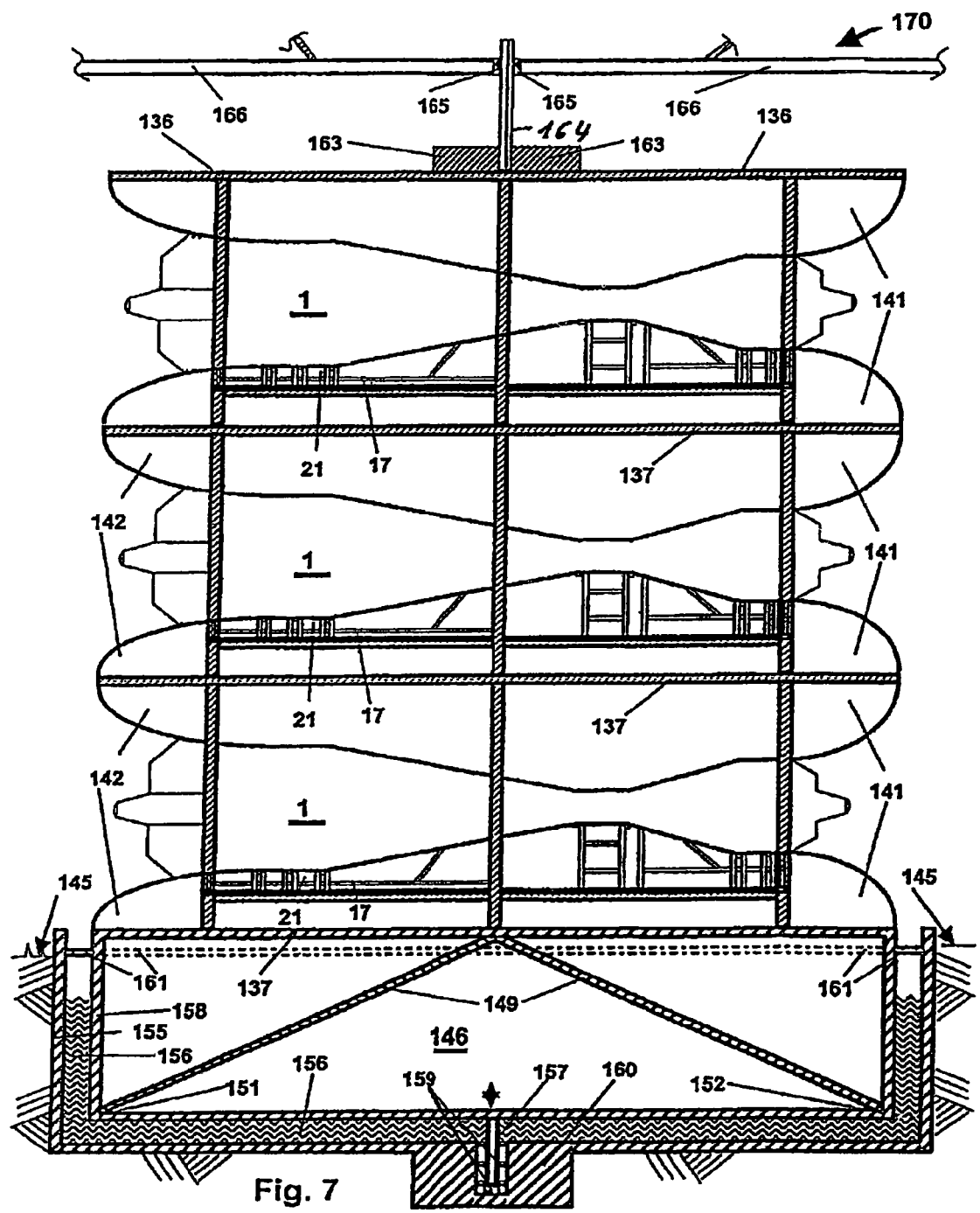
FIG. 7 shows a longitudinal cross section through an inventive wind power installation system with wind power installations according to the first embodiment arranged on top of and next to each other.

Reference is now made to FIG. 7, which shows another preferred embodiment of wind power installation system 170. This wind power installation system 170 is based on the design of the wind power installation according to FIGS. 4-6, wherein the same reference numbers are used.

Figure 8:
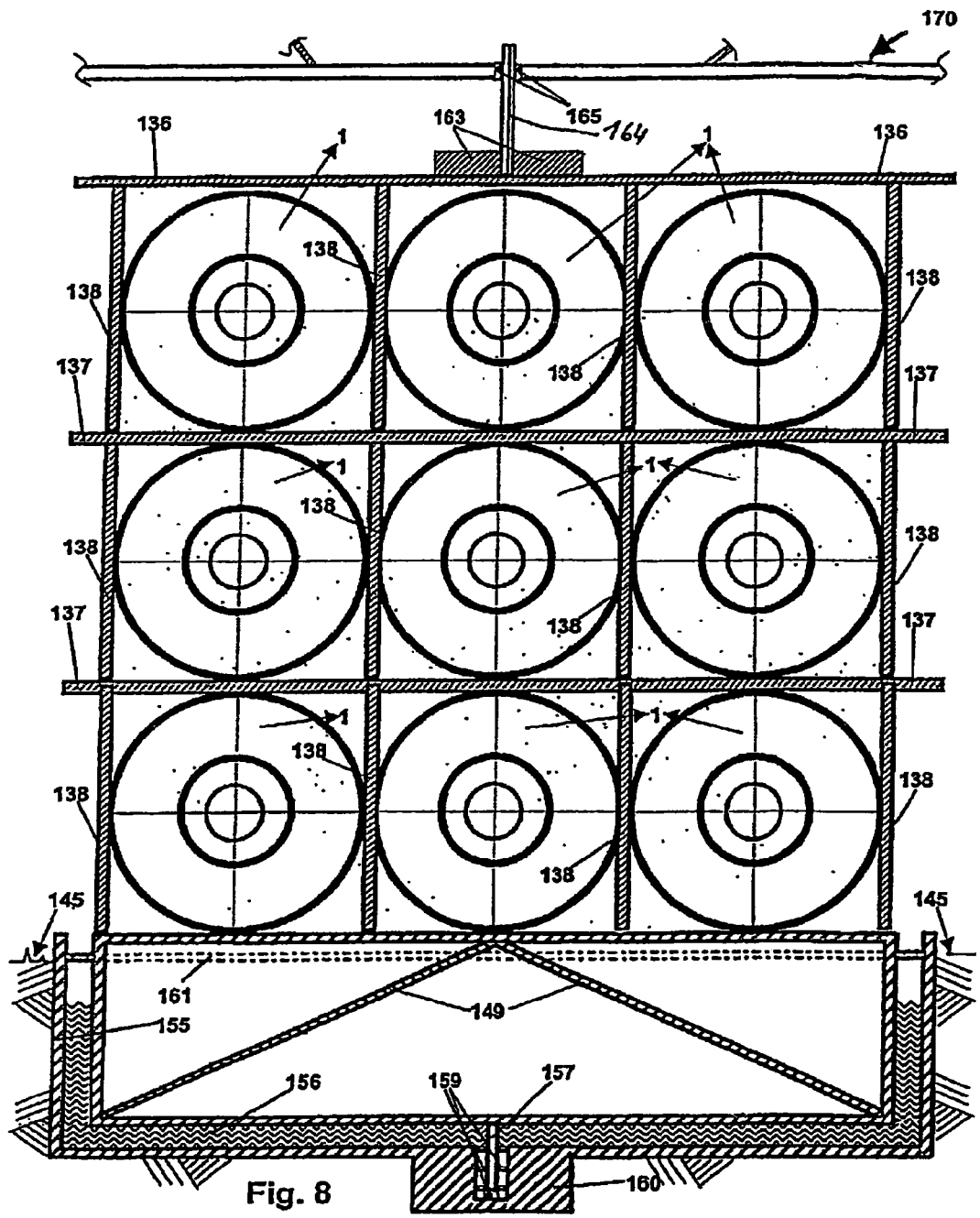
FIG. 8 shows a side view of the wind power installation system of FIG. 7.

The wind power installation system 170 thus includes several wind power installations, arranged in uniform fashion one above the other. As can be seen in FIG. 8, the inventive wind power installation system 170 also comprises multiple wind power installations 1 arranged next to each other. FIG. 8 shows nine wind power installations 1 in the wind power installation system 170. It will be understood that the specific number of nine is as an example only, and any desired combination of wind power installations arranged next to each other and/or on top of each other can be used within the scope of the invention.

As can also be seen in FIGS. 7 and 8, a bearing block, from which a king pin 164 extends vertically upward, is provided on top of the roof 136. The king pin 164 is supported rotatably in a bearing 165, which in turn is arranged in a mounting frame 166, as will be described in greater detail with reference to FIG. 9.

Figure 9:
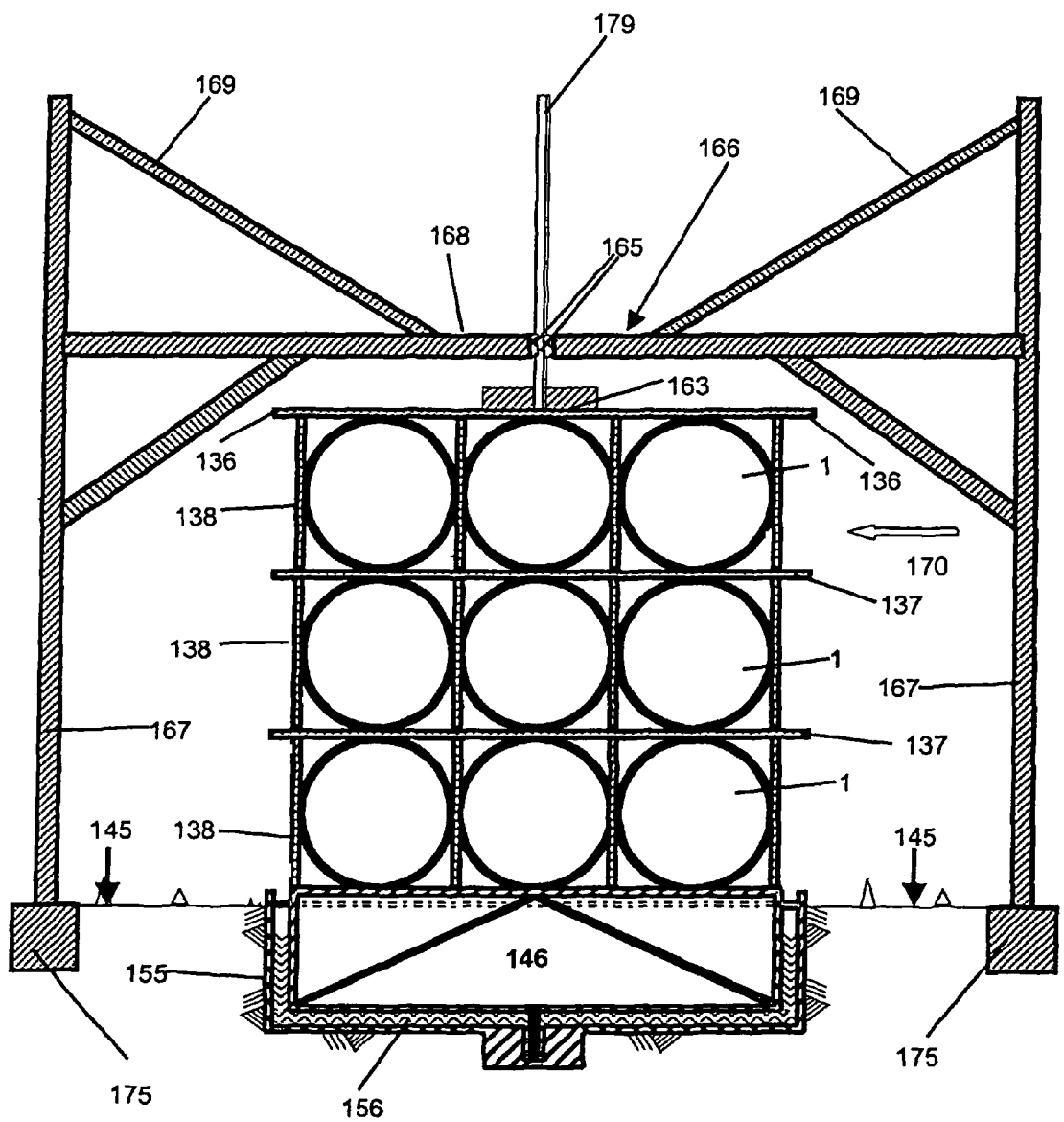
FIG. 9 shows another embodiment of the inventive wind power installation system with upper rotational support.

FIG. 9 shows a front view of the wind power installation system 170 in its entirety. In addition to the diagram according to FIG. 8, the mounting frame 166 is shown, which serves to support the wind power installation system rotatably and in a stable configuration. As will be appreciated, since considerable force can act on the system, especially when the winds are strong stability is of vital importance being able to effectively use the system. Frame 166 includes support posts 167 and transverse struts 168 with corresponding additional reinforcements 169. The support posts 167(totaling 4, for example), are connected to the foundation blocks 175. Details concerning the construction of an effective frame structure lies well within the competence of one skilled in the art and will not be set forth herein.

Figure 10:
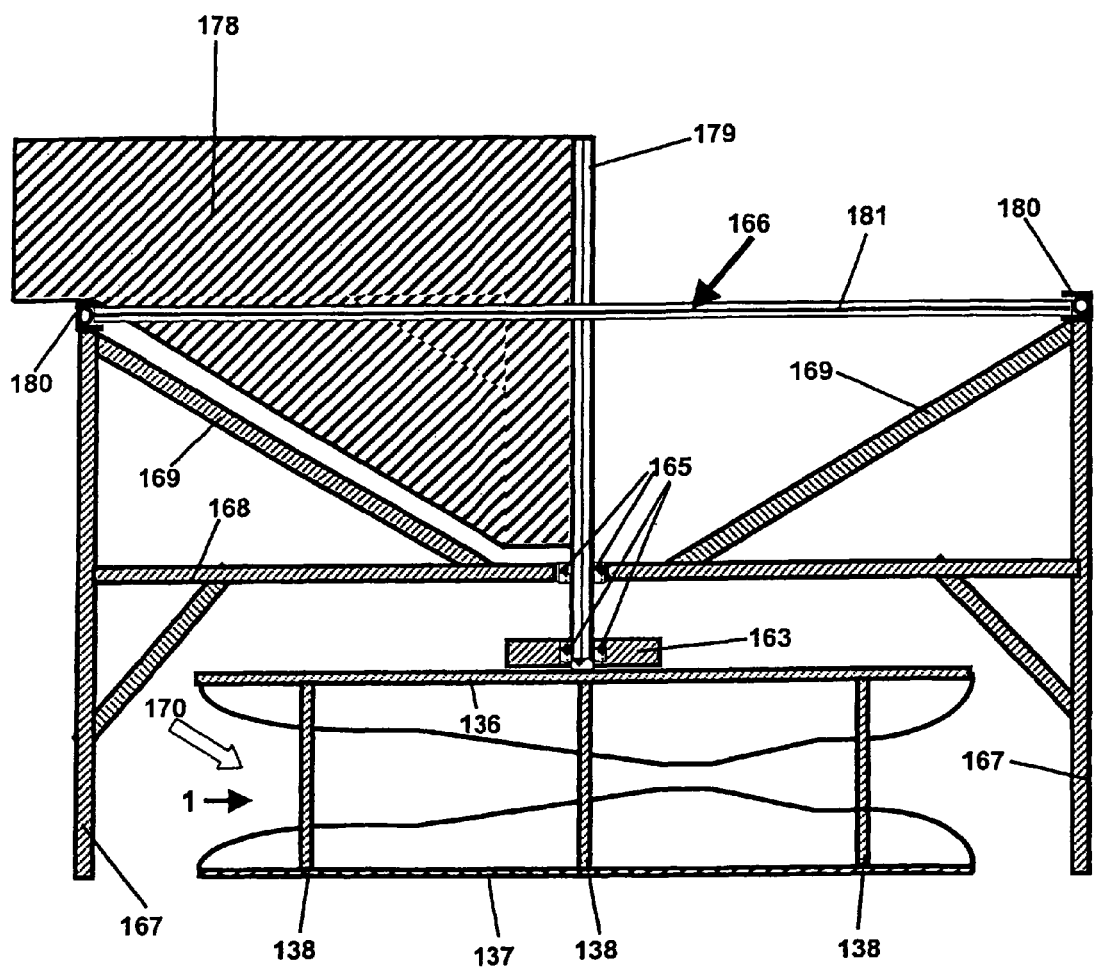
FIG. 10 shows a side view of the inventive embodiment according to FIG. 9 of the wind power installation system with a sail.

FIG. 10 shows a schematic diagram of the upper part of the wind power installation system 170 of FIG. 9, but shifted 90°. In addition, a sail 178 is provided on top, above the crossbeam 168. The sail is attached to a mast 179, which is rotatably supported and connected to the roof 136. As a result, the system aligns itself with the wind in an effective manner.

For improved guidance, the sail 178 is supported by way of a bearing 180 on a ring 181, on which it can slide or roll.

Figure 11:
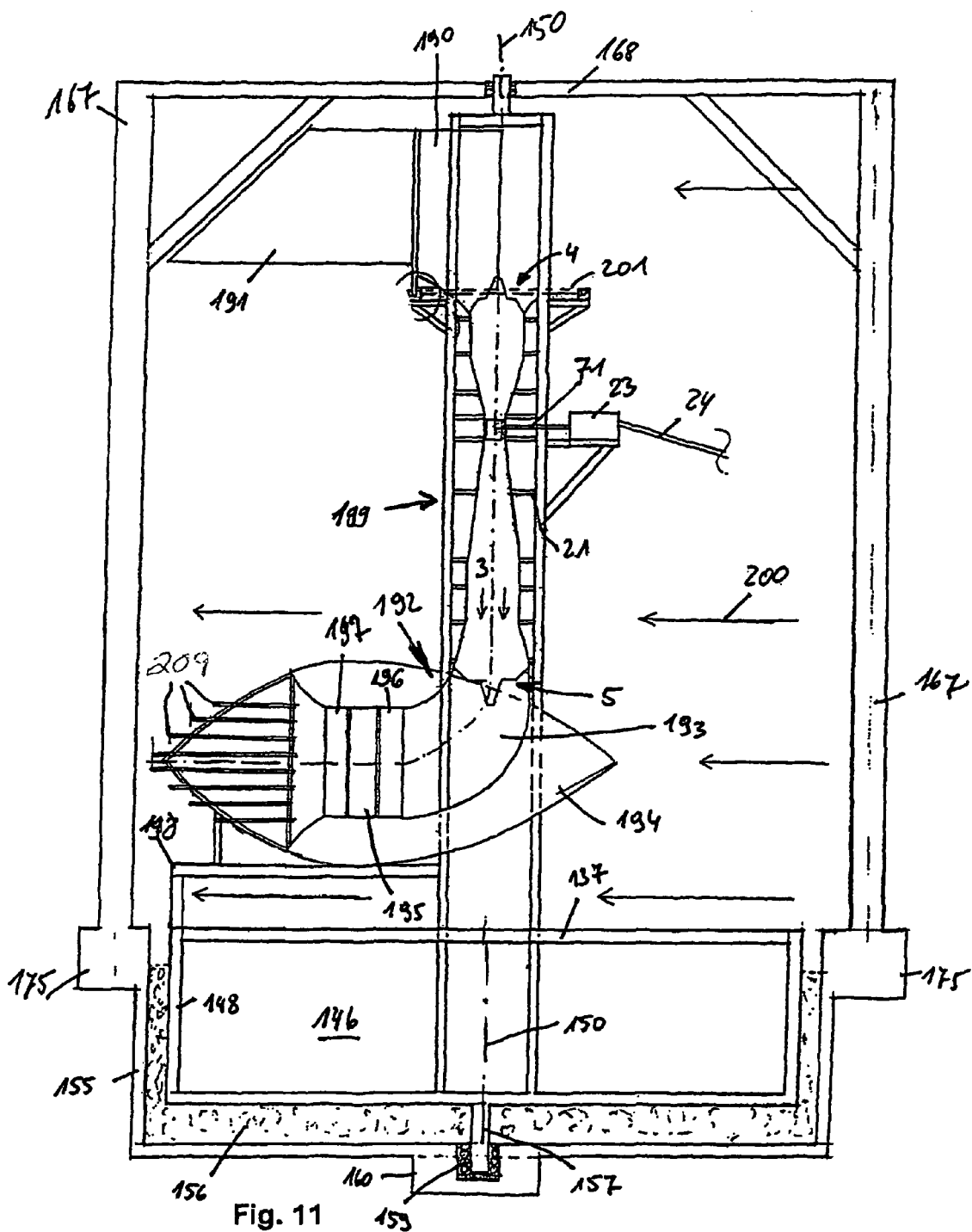
FIG. 11 shows a partial cross-sectional diagram of a third embodiment of the inventive wind power installation.
Figure 12:
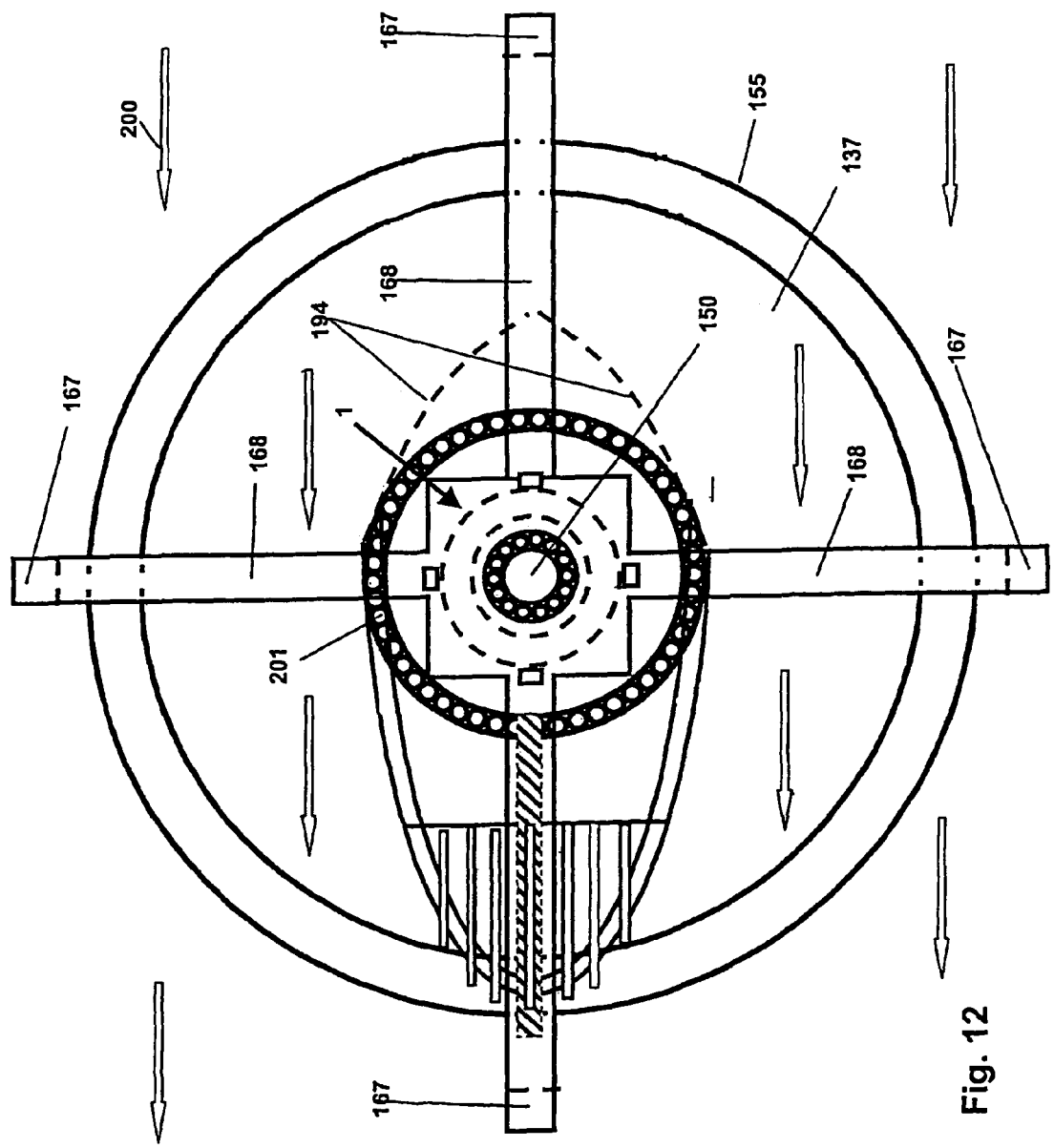
FIG. 12 shows a plan view of the wind power installation according to FIG. 11.

FIGS. 11 and 12 show a another preferred embodiment of wind power installation 1. This embodiment has the special feature of being set up vertically.

So that the wind, which is flowing essentially in the direction of the arrow 200, can be introduced, the installation preferably has a semicircular air feed device 190 at the inlet 4. This conducts the incoming air stream to the inlet 4, which is followed by a wind power installation according to one embodiment in FIGS. 1.a-2.b or according to a second embodiment in FIG. 3.

The generator 23 is driven by the takeoff shaft 71, and the current thus generated is sent away through a cable 24.

At the outlet 5, a flow deflection device 192 is provided, which comprises a flow channel; to deflects the outflowing air stream from the vertical direction into generally horizontal direction.

The flow channel is arranged in a deflector body 194, which comprises a special shape. It preferably has the shape of a "double wing"; that is, the air arriving in the direction of the arrow 200 is deflected both upward and downward and thus accelerated. This leads advantageously to the result that the air leaving the installation 1 is carried along downstream of the flow channel 193.

As can be seen in FIG. 11, the flow channel 193 expands in the flow direction and comprises another acceleration device 195, which can be designed in the same way as described above; that is, it can comprise one or more fans. An upstream stator 196 and a downstream stator 197 can also be provided as described above.

Baffles 209 are arranged downstream of the flow channel 193. These serve to align the air stream coming from flow channel 193. They can project beyond its cross section, so that they also align the ambient air flowing past in direction 200.

The deflector body 194 is supported by a frame 198.

Wind power installation 1 is suspended in an appropriate frame structure 199. In the area of the air feed device 190, a sail 191 is attached to frame structure 199 and serves to keep the entire installation facing into the wind. It is supported by the deflector body 194.

As can be seen in FIG. 12, a bearing ring 201 is provided.

Figure 13:
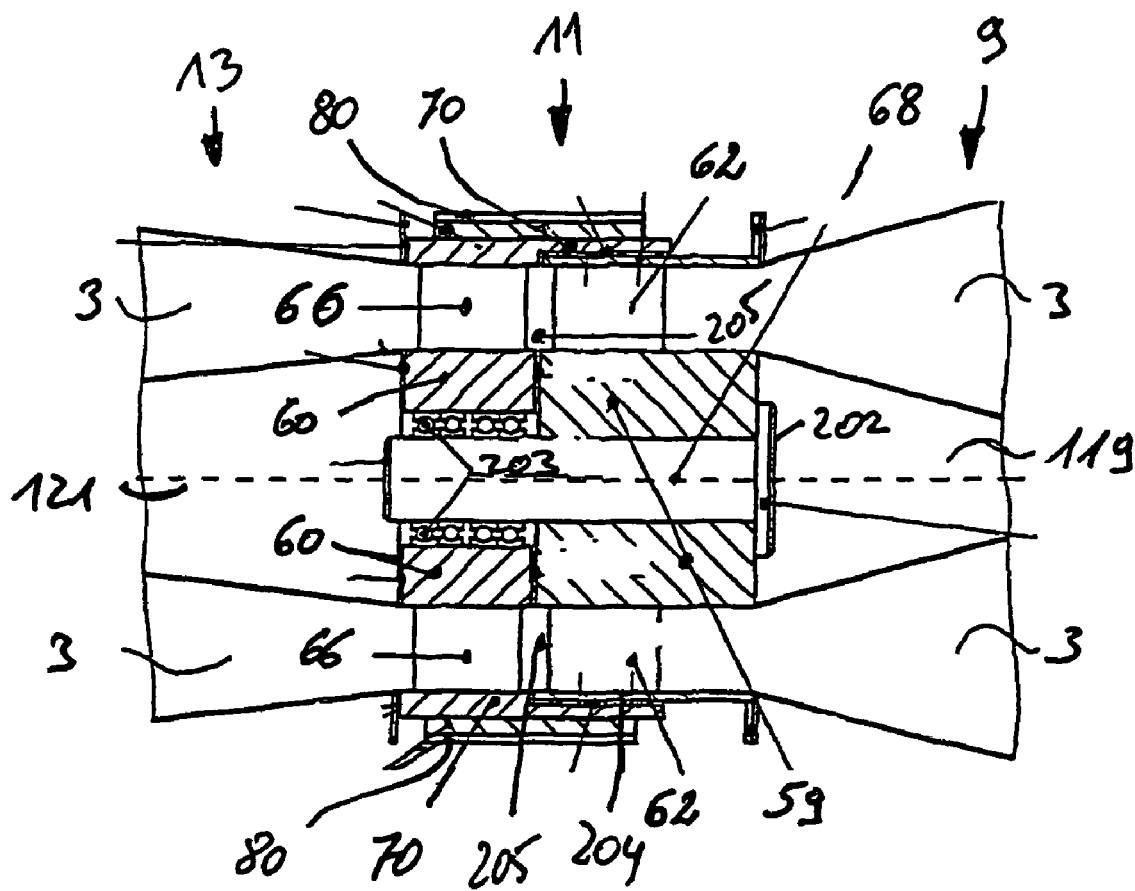
FIG. 13 shows a side view of an inventive rotor and gear unit device according to the present invention.

FIG. 13 shows a preferred embodiment of a rotor device. A bearing device 59 is mounted at one end of a rigid shaft 68, which includes a flange 202. A bearing 203, which is connected to a rotor 60, is mounted on the other end of the shaft.

The rotor 60 includes rotor blades or vanes 66, which are connected to an outer ring 70. The bearing device 59 also includes plates 62, which are connected to an outer ring 204 as part of the external sleeve 6 of flow channel 3. The rotating outer ring 70 includes a gear rim 80 arranged uniformly around the circumference of outer ring 70 and which meshes with one or more pinions (not shown). Each of the pinions is connected to a drive shaft which drives a generator.

An air gap 205 of sufficient size is provided between plates 62 and vanes 66.

Figure 14:
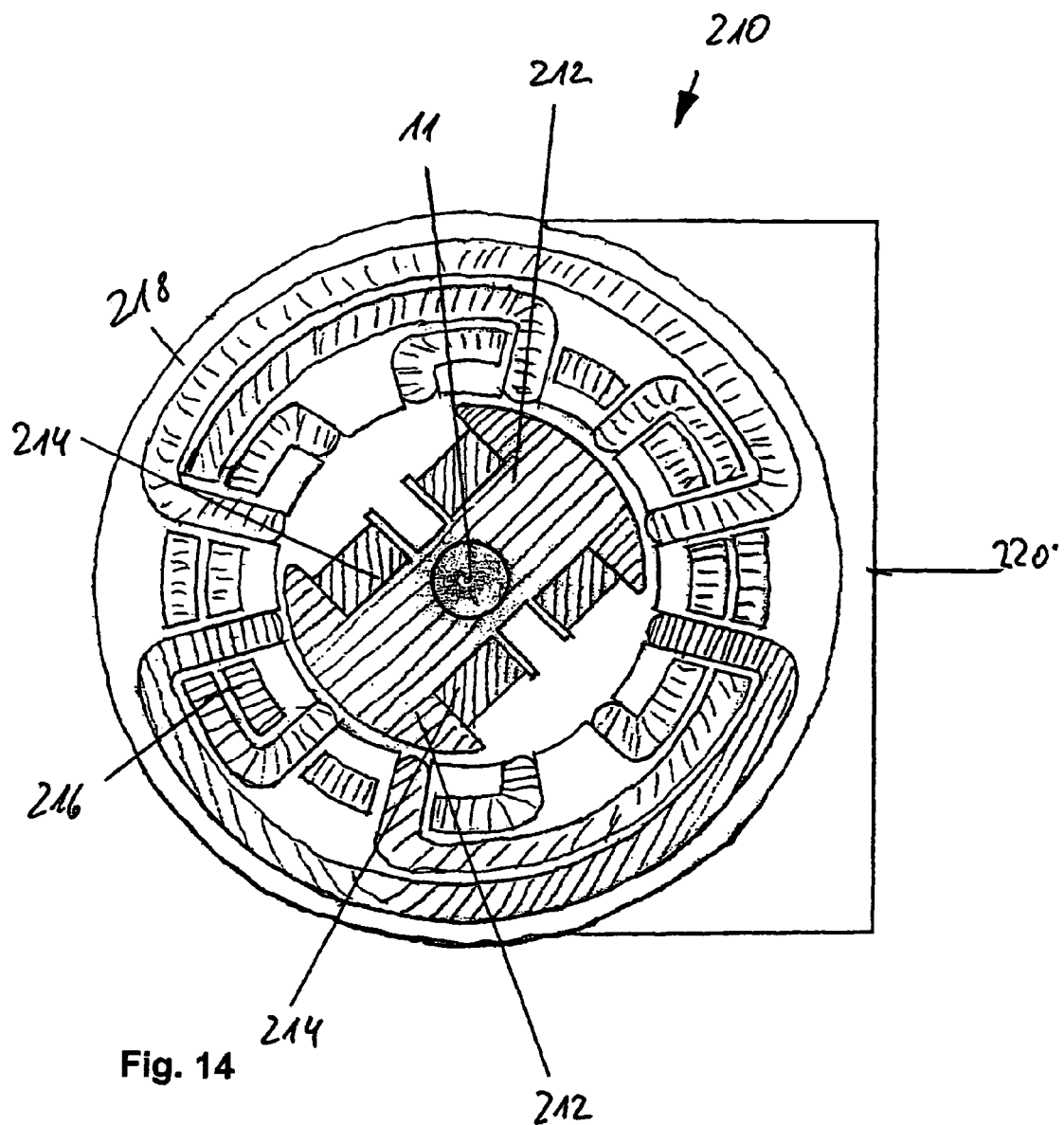
FIG. 14 shows a schematic diagram of a generator according to the present invention.

FIG. 14 shows another preferred embodiment of generator 210. The generator 210 is designed in conventional fashion and includes an armature or a rotor 212 with excitation windings 214. Appropriate induction windings are arranged in the rotor.

Generator 210 is constructed such that, in the embodiment according to FIG. 13, rotor 212 surrounds the third section 11 of the wind power installation 1. In such construction a fitted connection is used in place of the outer gear rim 80.

The generator also comprises a stand 218 and a bracket 220, which is rotated 90° in the clockwise direction and can also serve as a support bearing.

With the present wind power installation, therefore, the possibility is created of recovering energy from ambient air in a much more efficient, much less expensive, and much more compact manner.

Such wind power installations also provide improved output power over previous devices.

While the invention is shown in several forms and preferred embodiments, it is not limited to those embodiments illustrated, but is susceptible to various changes and modifications without departing from the spirit and scope of the invention.

What is claimed is:

1. A wind power installation for generating electric power from ambient air, with a flow channel, through which the ambient air is conducted by the formation of an air stream, wherein the flow channel comprises an external sleeve forming its boundary and also comprises:
   a first section with an essentially constant cross section, into which the ambient air can be introduced, wherein an air acceleration device is provided in the first section,
   a second tapering section,
   a third section, following the second section, in which third section a rotor is installed, which is set in rotation by the through-flowing air stream and the rotation of which serves to generate electric power,
   a fourth enlarging section, and a fifth section, which comprises a second air acceleration device, which serves to discharge the air introduced into the flow channel.

2. A wind power installation of claim 1 characterized in that the air acceleration device of the first and/or of the fifth section of the flow channel comprises at least one fan.

3. A wind power installation of claim 1 characterized in that downstream with respect to the flow direction of the ambient air of the air acceleration device of the first and/or of the fifth section of the flow channel, a flow guide device is provided, which converts the turbulent and/or rotating air stream produced by the air acceleration device in question into a laminar flow.

4. A wind power installation of claim 3 characterized in that the flow guide device is a downstream stator.

5. A wind power installation of claim 3 characterized in that the flow guide device is a parallel-tube device.

6. A wind power installation of claim 3 characterized in that the flow guide device comprises both a downstream stator and a parallel-tube device.

7. A wind power installation of claim 3 characterized in that, downstream of the flow guide device following the air acceleration device in the first section, a tapering tubular section is provided, in which a flow cone, which tapers to a point and along which the air stream flows is provided, wherein the taper angle α of the cone is essentially 15° or less.

8. A wind power installation of claim 7 characterized in that a section of constant cross section is installed after the tapering tubular section of the flow channel.

9. A wind power installation of claim 8 wherein another flow guide device is provided in the section of constant cross section.

10. A wind power installation of claim 1 characterized in that, upstream of the air acceleration device of the first section and/or of the air acceleration device of the fifth section, an air guide device is provided to achieve a laminar air flow.

11. A wind power installation of claim 10 characterized in that a parallel-tube device is provided upstream of the air guide device of the fifth section.

12. A wind power installation of claim 1 characterized in that the flow channel narrows down in the second tapering section with an angle α of 15° or less.

13. A wind power installation of claim 1 characterized in that the flow channel expands in the fourth section downstream from the rotor at an angle β of 7° or less.

14. A wind power installation of claim 1 characterized in that the cross section of the outlet of the flow channel is larger than the cross section of the inlet of the flow channel.

15. A wind power installation of claim 14 wherein the cross section of the outlet of the flow channel is essentially twice as large as cross section of the inlet of the flow channel.

16. A wind power installation of claim 1 characterized in that, in the second section, a cone, which expands from a tip to the cross section of the hub of the rotor, is provided, the expansion angle α of which is the same as the taper angle α of the second tapering section.

17. A wind power installation of claim 1 characterized in that, the rotor includes a hub, and in the fourth section, a cone, which tapers to a tip, is provided, the outlet cross section of which is essentially the same as the cross section of the hub of the rotor, wherein the taper angle β of the cone is the same as the expansion angle β of the fourth enlarging section.

18. A wind power installation of claim 1 characterized in that, rotor includes a hub, and upstream of the fifth section, in front of the flow guide device, a cone, which expands from a tip at an angle β, is provided, the end cross section of which is essentially the same as the cross section of the hub of the flow guide device.

19. A wind power installation of claim 1 characterized in that the third section comprises a gear unit, which converts the rotation of the rotor into a rotational movement of at least one output shaft, which extends in an essentially perpendicular manner from the flow channel and serves to drive a generator.

20. A wind power installation of claim 19 characterized in that the gear unit comprises a housing, in which a shaft is supported, wherein one end of the shaft is connected outside the housing to a rotor, while the other end is connected to a takeoff shaft offset by 90°, and in that the housing of the gear unit is supported in a bearing device, which comprises bearing plates, which are connected to the external sleeve of the flow channel.

21. A wind power installation of claim 1 characterized in that the rotor is supported on a shaft, which is connected nonrotatably to the bearing device; in that the rotor comprises an external tubular section, which forms a part of the external sleeve of the flow channel, wherein the external tubular section comprises a gear rim, which serves to transmit the rotation of the rotor by way of a gear unit to a generator.

22. A wind power installation of claim 21 characterized in that, to transmit the rotational movement of the rotor, a plurality of pinions are distributed uniformly around the circumference are provided, each of which is connected to a drive shaft, each drive shaft being connected to a generator.

23. A wind power installation of claim 1 characterized in that the rotor is mounted on a shaft, which is connected nonrotatably to a bearing device, and in that the rotor comprises an external section, which drives the rotor and/or the armature of a generator.

24. A wind power installation of claim 1 characterized in that it is arranged in a stand, which is supported rotatably.

25. A wind power installation of claim 24 characterized in that it comprises a bottom wall, a roof, and a plurality of posts, wherein the first to the fifth sections of the flow channel are arranged essentially between the outermost posts.

26. A wind power installation of claim 25 characterized in that the wind power installation is arranged a certain distance away from the bottom wall.

27. A wind power installation of claim 24 characterized in that an additional tapering section is provided on an air stream inlet side.

28. A wind power installation of claim 24 characterized in that an additional enlarging section is provided on an discharge side.

29. A wind power installation of claim 24 characterized in that the rotatable stand comprises a rotatable buoyancy unit which floats in a liquid.

30. A wind power installation of claim 29 characterized in that the liquid is held in a circular basin, in which the buoyancy unit is arranged.

31. A wind power installation of claim 29 characterized in that a king pin projects downward from a bottom plate of the buoyancy unit and is rotatably supported in a bearing, which is formed in a bearing block.

32. A wind power installation of claim 31 characterized in that a circumferential bearing is arranged above the level of the liquid between a side wall of the buoyancy unit and the basin.

33. A wind power installation of claim 1 characterized in that it is arranged vertically.

34. A wind power installation of claim 33 characterized in that an air feed device is provided at the upper inlet of the wind power installation.

35. A wind power installation of claim 34 characterized in that said air feed device is preferably semicircular in design.

36. A wind power installation of claim 33 characterized in that a flow deflection device, which comprises a flow channel, which deflects the outflowing air stream from the vertical direction into an essentially horizontal direction, is provided on the outlet side.

37. A wind power installation of claim 36 characterized in that the flow channel is arranged in a deflector body, around which the ambient air flows.

38. A wind power installation of claim 36 characterized in that the flow channel expands in the flow direction and preferably comprises an additional air acceleration device.

39. A wind power installation of claim 36 characterized in that downstream of the flow channel with respect to the direction of flow, several baffle plates are arranged.

40. A wind power installation of claim 39 characterized in that said baffle plates project beyond the cross section of the flow channel.

41. A wind power installation of claim 33 characterized in that a sail, which serves to keep the installation oriented in the optimal flow direction of the ambient air, is attached to the wind power installation.

42. A wind power installation system for generating electric power from ambient air of claim 1, characterized in that several wind power installations are arranged on top of or next to each other.

43. A wind power installation system of claim 42 characterized in that it comprises a stand, in which the wind power installations, which are arranged on top of or next to each other, are rotatably supported.

44. A method for generating electric power from ambient air, preferably ambient air which has been put in motion, which comprises the following steps:

introducing ambient air into a first section of a flow channel, accelerating the air stream by means of an acceleration device, which is installed in the first section of the flow channel, further accelerating the air stream in a second tapering section of the flow channel by means of a constriction in the flow channel, conducting the air stream through a third section of the flow channel and the driving of a rotor in this section, discharging the air stream into a fourth enlarging section of the flow channel, renewedly accelerating the air stream in a fifth section of the flow channel, and discharging the air stream into the environment, wherein both kinetic energy and heat energy are extracted from the air stream during its passage through the flow channel.

45. A method of claim 44 characterized in that, upstream of the acceleration device of the first and/or of the fifth section of the flow channel, the inflowing air is aligned as a laminar flow.

46. A method of claim 44 characterized in that the air stream is accelerated in the first and second sections of the flow channel so that it reaches a predetermined velocity by the time it enters the third section of the flow channel.

47. A method of claim 44 characterized in that a negative pressure is generated in the fourth enlarging section by the fifth section.

48. A method of claim 44 characterized in that, at the beginning of the power generation process, the acceleration devices are driven by external energy, and after a stable power production state has been reached, they are supplied with the generated power.

* * * * *